United States Patent
Zhamu et al.

(10) Patent No.: US 11,342,555 B2
(45) Date of Patent: May 24, 2022

(54) ENCAPSULATED CATHODE ACTIVE MATERIAL PARTICLES, LITHIUM SECONDARY BATTERIES CONTAINING SAME, AND METHOD OF MANUFACTURING

(71) Applicant: Global Graphene Group, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 59 days.

(21) Appl. No.: 16/685,174

(22) Filed: Nov. 15, 2019

(65) Prior Publication Data

US 2020/0091507 A1 Mar. 19, 2020

Related U.S. Application Data

(62) Division of application No. 15/483,342, filed on Apr. 10, 2017, now Pat. No. 10,483,533.

(51) Int. Cl.
*H01M 4/36* (2006.01)
*H01M 10/0525* (2010.01)
(Continued)

(52) U.S. Cl.
CPC ............. *H01M 4/366* (2013.01); *C08K 3/04* (2013.01); *C08K 3/041* (2017.05); *C08K 3/10* (2013.01);
(Continued)

(58) Field of Classification Search
CPC .... H01M 4/366; H01M 4/131; H01M 4/1391; H01M 4/48; H01M 4/623; H01M 4/625;
(Continued)

(56) References Cited

U.S. PATENT DOCUMENTS 2,798,878 A 7/1957 Hummers
3,836,511 A 9/1974 O'farrell et al.
(Continued)

FOREIGN PATENT DOCUMENTS

CN 103258990 A 8/2013
CN 105322132 A 2/2016
(Continued)

OTHER PUBLICATIONS

An et al., "Diameter-Selected Synthesis of Single Crystalline Trigonal Selenium Nanowires" Materials Chemistry and Physics (2007) vol. 101, No. 2-3, pp. 357-361.
(Continued)

*Primary Examiner* — Sean P Cullen

(57) ABSTRACT

Provided is particulate of a cathode active material for a lithium battery, comprising one or a plurality of cathode active material particles being embraced or encapsulated by a thin layer of a high-elasticity polymer having a recoverable tensile strain no less than 5%, a lithium ion conductivity no less than $10^{-6}$ S/cm at room temperature, and a thickness from 0.5 nm to 10 μm, wherein the polymer contains an ultrahigh molecular weight (UHMW) polymer having a molecular weight from $0.5 \times 10^6$ to $9 \times 10^6$ grams/mole. The UHMW polymer is preferably selected from polyacrylonitrile, polyethylene oxide, polypropylene oxide, polyethylene glycol, polyvinyl alcohol, polyacrylamide, poly(methyl methacrylate), poly(methyl ether acrylate), a copolymer thereof, a sulfonated derivative thereof, a chemical derivative thereof, or a combination thereof.

13 Claims, 8 Drawing Sheets

(51) Int. Cl.

| | | |
|---|---|---|
| C08K 3/26 | (2006.01) | |
| C08K 5/10 | (2006.01) | |
| C08K 3/16 | (2006.01) | |
| C08K 3/22 | (2006.01) | |
| C08K 5/098 | (2006.01) | |
| C08L 33/20 | (2006.01) | |
| C08K 9/08 | (2006.01) | |
| C08K 9/10 | (2006.01) | |
| C08K 3/04 | (2006.01) | |
| C08K 3/10 | (2018.01) | |
| C08K 3/34 | (2006.01) | |
| C08K 3/30 | (2006.01) | |
| H01M 4/58 | (2010.01) | |
| C08K 3/38 | (2006.01) | |
| C08K 5/04 | (2006.01) | |
| H01M 4/62 | (2006.01) | |
| H01M 4/60 | (2006.01) | |

(52) U.S. Cl.
CPC ............ $C08K\ 3/16$ (2013.01); $C08K\ 3/22$ (2013.01); $C08K\ 3/26$ (2013.01); $C08K\ 3/30$ (2013.01); $C08K\ 3/34$ (2013.01); $C08K\ 3/38$ (2013.01); $C08K\ 5/04$ (2013.01); $C08K\ 5/098$ (2013.01); $C08K\ 5/10$ (2013.01); $C08K\ 9/08$ (2013.01); $C08K\ 9/10$ (2013.01); $C08L\ 33/20$ (2013.01); $H01M\ 4/5815$ (2013.01); $H01M\ 4/5825$ (2013.01); $H01M\ 4/602$ (2013.01); $H01M\ 4/62$ (2013.01); $H01M\ 4/624$ (2013.01); $H01M\ 10/0525$ (2013.01); $C08K\ 2003/2203$ (2013.01); $C08K\ 2003/262$ (2013.01); $C08K\ 2003/3009$ (2013.01); $C08K\ 2201/001$ (2013.01); $C08L\ 2203/20$ (2013.01); $C08L\ 2205/025$ (2013.01); $H01M\ 2300/0082$ (2013.01); $H01M\ 2300/0091$ (2013.01)

(58) Field of Classification Search
CPC . C08K 3/041; C08K 3/04; C08K 3/10; C08K 3/16; C08K 3/22; C08K 3/26; C08K 3/30; C08K 3/34; C08K 9/08; C08K 9/10; C08L 33/20; C08L 71/02
USPC .................. 429/213, 217, 218.1, 232
See application file for complete search history.

(56) References Cited

U.S. PATENT DOCUMENTS

| | | |
|---|---|---|
| 4,720,910 A | 1/1988 | Rourke et al. |
| 5,057,339 A | 10/1991 | Ogawa |
| 5,270,417 A | 12/1993 | Soga et al. |
| 5,342,710 A | 8/1994 | Koksbang |
| 5,350,647 A | 9/1994 | Hope et al. |
| 5,409,785 A | 4/1995 | Nakano et al. |
| 5,424,151 A | 6/1995 | Koksbang et al. |
| 5,434,021 A | 7/1995 | Fauteux et al. |
| 5,460,905 A | 10/1995 | Skotheim |
| 5,536,599 A | 7/1996 | Alamgir et al. |
| 5,648,187 A | 7/1997 | Skotheim |
| 5,961,672 A | 10/1999 | Skotheim et al. |
| 6,025,094 A | 2/2000 | Visco et al. |
| 6,218,055 B1 | 4/2001 | Shah et al. |
| 6,447,952 B1 | 9/2002 | Spiegel et al. |
| 6,451,484 B1 | 9/2002 | Han et al. |
| 6,475,678 B1 | 11/2002 | Suzuki |
| 6,515,101 B1 | 2/2003 | Sheares |
| 6,620,547 B1 | 9/2003 | Sung et al. |
| 6,733,924 B1 | 5/2004 | Skotheim et al. |
| 6,797,428 B1 | 9/2004 | Skotheim et al. |
| 6,936,381 B2 | 8/2005 | Skotheim et al. |
| 7,247,408 B2 | 7/2007 | Skotheim et al. |
| 7,282,295 B2 | 10/2007 | Visco et al. |
| 7,282,296 B2 | 10/2007 | Visco et al. |
| 7,282,302 B2 | 10/2007 | Visco et al. |
| 7,618,678 B2 | 11/2009 | Mao et al. |
| 8,597,828 B2 | 12/2013 | Martinet et al. |
| 9,905,856 B1 | 2/2018 | Zhamu et al. |
| 10,084,182 B2 | 9/2018 | Pan et al. |
| 10,483,533 B2 | 11/2019 | Zhamu et al. |
| 10,629,899 B1 | 4/2020 | Jang |
| 2002/0034685 A1 | 3/2002 | Sato et al. |
| 2002/0182488 A1 | 12/2002 | Cho et al. |
| 2002/0195591 A1 | 12/2002 | Ravet et al. |
| 2003/0180619 A1 | 9/2003 | Tamura et al. |
| 2004/0018430 A1 | 1/2004 | Holman et al. |
| 2005/0034993 A1 | 2/2005 | Gozdz et al. |
| 2005/0098914 A1 | 5/2005 | Varma et al. |
| 2005/0118508 A1 | 6/2005 | Yong et al. |
| 2005/0136330 A1 | 6/2005 | Mao et al. |
| 2006/0263697 A1 | 11/2006 | Dahn et al. |
| 2007/0059600 A1 | 3/2007 | Kim et al. |
| 2007/0218369 A1 | 9/2007 | Kaiduka et al. |
| 2007/0289879 A1 | 12/2007 | Horton |
| 2008/0248393 A1 | 10/2008 | Richard et al. |
| 2008/0318128 A1 | 12/2008 | Simoneau et al. |
| 2009/0155676 A1 | 6/2009 | Zhamu et al. |
| 2009/0169725 A1 | 7/2009 | Zhamu et al. |
| 2009/0186093 A1 | 7/2009 | Liu et al. |
| 2010/0099029 A1 | 4/2010 | Kinoshita et al. |
| 2010/0112454 A1 | 5/2010 | Visco et al. |
| 2010/0143798 A1 | 6/2010 | Zhamu et al. |
| 2010/0173198 A1 | 7/2010 | Zhamu et al. |
| 2011/0059361 A1 | 3/2011 | Wilkening et al. |
| 2011/0104571 A1 | 5/2011 | Zhamu et al. |
| 2011/0143211 A1 | 6/2011 | Takeyama |
| 2011/0177388 A1 | 7/2011 | Bae et al. |
| 2011/0244337 A1 | 10/2011 | Ohta et al. |
| 2011/0262816 A1 | 10/2011 | Amatucci |
| 2012/0058397 A1* | 3/2012 | Zhamu .......... H01M 4/13 429/231.8 |
| 2012/0064409 A1 | 3/2012 | Zhamu et al. |
| 2012/0070708 A1 | 3/2012 | Ohira et al. |
| 2012/0070746 A1 | 3/2012 | Mikhaylik et al. |
| 2012/0088154 A1 | 4/2012 | Liu et al. |
| 2013/0052544 A1 | 2/2013 | Ohkubo et al. |
| 2013/0054061 A1 | 2/2013 | Nishimoto |
| 2013/0157141 A1 | 6/2013 | Zhong et al. |
| 2013/0164615 A1 | 6/2013 | Manthiram et al. |
| 2013/0171339 A1 | 7/2013 | Wang et al. |
| 2013/0224603 A1 | 8/2013 | Chen et al. |
| 2013/0292613 A1 | 11/2013 | Wegner et al. |
| 2014/0072879 A1 | 3/2014 | Chen et al. |
| 2014/0097380 A1 | 4/2014 | Wu et al. |
| 2014/0147738 A1 | 5/2014 | Chen et al. |
| 2014/0147751 A1 | 5/2014 | Yang et al. |
| 2014/0154572 A1 | 6/2014 | Singh et al. |
| 2014/0162121 A1 | 6/2014 | Ryu et al. |
| 2014/0178747 A1 | 6/2014 | Tsai et al. |
| 2014/0234702 A1 | 8/2014 | Zhang et al. |
| 2014/0235513 A1 | 8/2014 | Kverel et al. |
| 2014/0255785 A1 | 9/2014 | Do et al. |
| 2014/0363746 A1 | 12/2014 | He et al. |
| 2015/0044556 A1 | 2/2015 | Wang et al. |
| 2015/0064568 A1 | 3/2015 | Yushin et al. |
| 2015/0064574 A1 | 3/2015 | He et al. |
| 2015/0079485 A1 | 3/2015 | Choi et al. |
| 2015/0162641 A1 | 6/2015 | Visco et al. |
| 2015/0180000 A1 | 6/2015 | Roumi |
| 2015/0180037 A1 | 6/2015 | Gronwald et al. |
| 2015/0218323 A1 | 8/2015 | Kim et al. |
| 2015/0221935 A1 | 8/2015 | Zhou et al. |
| 2015/0236372 A1 | 8/2015 | Yushin et al. |
| 2015/0244025 A1 | 8/2015 | Rhee et al. |
| 2015/0318532 A1 | 11/2015 | Manthiram et al. |
| 2015/0325844 A1 | 11/2015 | Inoue |
| 2015/0372294 A1 | 12/2015 | Minami et al. |
| 2016/0013481 A1 | 1/2016 | Jeong et al. |
| 2016/0043384 A1 | 2/2016 | Zhamu et al. |
| 2016/0087266 A1 | 3/2016 | Muldoon et al. |
| 2016/0126543 A1 | 5/2016 | Ota et al. |
| 2016/0149216 A1 | 5/2016 | Mizuno et al. |

(56) References Cited

U.S. PATENT DOCUMENTS

| | | |
|---|---|---|
| 2016/0181585 A1 | 6/2016 | Choi et al. |
| 2016/0181611 A1 | 6/2016 | Cho et al. |
| 2016/0204431 A1 | 7/2016 | Sawa |
| 2016/0218341 A1 | 7/2016 | Kumar et al. |
| 2016/0240896 A1 | 8/2016 | Zhang et al. |
| 2016/0260966 A1* | 9/2016 | Ohsawa ............... H01M 4/625 |
| 2016/0301075 A1 | 10/2016 | Zhamu et al. |
| 2016/0344035 A1 | 11/2016 | Zhamu et al. |
| 2016/0351877 A1 | 12/2016 | Kusachi et al. |
| 2016/0351909 A1 | 12/2016 | Bittner et al. |
| 2016/0372743 A1 | 12/2016 | Cho et al. |
| 2016/0372784 A1 | 12/2016 | Hayner et al. |
| 2017/0002154 A1 | 1/2017 | Hiasa et al. |
| 2017/0005369 A1 | 1/2017 | Nakagawa et al. |
| 2017/0018799 A1 | 1/2017 | Jeong |
| 2017/0033357 A1 | 2/2017 | Cho et al. |
| 2017/0047584 A1 | 2/2017 | Hwang et al. |
| 2017/0062827 A1 | 3/2017 | Bruckmeier et al. |
| 2017/0062830 A1 | 3/2017 | Bao et al. |
| 2017/0092986 A1 | 3/2017 | Ogawa et al. |
| 2017/0098824 A1 | 4/2017 | Fasching et al. |
| 2017/0098856 A1 | 4/2017 | Zhamu et al. |
| 2017/0104204 A1 | 4/2017 | Zhamu et al. |
| 2017/0104217 A1 | 4/2017 | Yu et al. |
| 2017/0117535 A1 | 4/2017 | Yoon et al. |
| 2017/0117538 A1 | 4/2017 | Bendimerad et al. |
| 2017/0117589 A1 | 4/2017 | Tajima et al. |
| 2017/0141387 A1 | 5/2017 | Hayner et al. |
| 2017/0141399 A1 | 5/2017 | Lux et al. |
| 2017/0166722 A1 | 6/2017 | Zhamu et al. |
| 2017/0179468 A1 | 6/2017 | Fanous et al. |
| 2017/0194640 A1 | 7/2017 | Bucur et al. |
| 2017/0194648 A1 | 7/2017 | Bucur et al. |
| 2017/0200943 A1 | 7/2017 | Kawakami |
| 2017/0207484 A1 | 7/2017 | Zhamu et al. |
| 2017/0279125 A1 | 9/2017 | Ohsawa et al. |
| 2017/0288211 A1 | 10/2017 | Zhamu et al. |
| 2017/0294643 A1 | 10/2017 | Burshtain et al. |
| 2017/0309917 A1 | 10/2017 | Lee et al. |
| 2017/0338472 A1 | 11/2017 | Zhamu et al. |
| 2017/0338474 A1 | 11/2017 | Lee et al. |
| 2017/0338490 A1 | 11/2017 | Xiao et al. |
| 2018/0013138 A1 | 1/2018 | Chen et al. |
| 2018/0053978 A1 | 2/2018 | Song et al. |
| 2018/0083265 A1 | 3/2018 | Singh et al. |
| 2018/0190975 A1 | 7/2018 | Ishii et al. |
| 2018/0219215 A1 | 8/2018 | Bucur et al. |
| 2018/0233736 A1 | 8/2018 | Zhamu et al. |
| 2018/0241031 A1 | 8/2018 | Pan et al. |
| 2018/0241032 A1 | 8/2018 | Pan et al. |
| 2018/0248173 A1 | 8/2018 | Pan et al. |
| 2018/0277913 A1 | 9/2018 | Pan et al. |
| 2018/0287142 A1 | 10/2018 | Zhamu et al. |
| 2018/0294475 A1 | 10/2018 | Zhamu et al. |
| 2018/0294476 A1 | 10/2018 | Zhamu et al. |
| 2018/0301707 A1 | 10/2018 | Pan et al. |
| 2019/0051905 A1 | 2/2019 | Zhamu et al. |
| 2019/0058185 A1 | 2/2019 | Lee et al. |
| 2019/0077669 A1 | 3/2019 | Zhamu et al. |
| 2019/0081325 A1 | 3/2019 | Takeda et al. |
| 2019/0088958 A1 | 3/2019 | Viner et al. |
| 2019/0260028 A1 | 8/2019 | Zhamu et al. |
| 2019/0319303 A1 | 10/2019 | Kushida et al. |
| 2019/0386332 A1 | 12/2019 | Zhamu et al. |
| 2019/0393466 A1 | 12/2019 | Lin et al. |
| 2019/0393495 A1 | 12/2019 | He et al. |
| 2019/0393510 A1 | 12/2019 | He et al. |
| 2019/0393543 A1 | 12/2019 | Zhamu et al. |

FOREIGN PATENT DOCUMENTS

| | | |
|---|---|---|
| CN | 108899472 A | 11/2018 |
| EP | 2787563 A1 | 10/2014 |
| JP | 1275613 A | 11/1989 |
| JP | 2010160984 A | 7/2010 |
| JP | 2011524611 A | 9/2011 |
| JP | 2015084320 A | 4/2015 |
| JP | 2015176656 A | 10/2015 |
| KR | 1020030050475 A | 6/2003 |
| KR | 100670527 B1 | 1/2007 |
| KR | 1020140101640 A | 8/2014 |
| KR | 20160052351 A | 5/2016 |
| KR | 1020160085386 A | 7/2016 |
| KR | 1020160087511 A | 7/2016 |
| KR | 1020170001069 U | 3/2017 |
| KR | 1020170086003 A | 7/2017 |
| KR | 1020170126404 A | 11/2017 |
| KR | 1020180035752 A | 4/2018 |
| WO | 2007108424 A1 | 9/2007 |
| WO | 2015141799 A1 | 9/2015 |
| WO | 2016015915 A1 | 2/2016 |
| WO | 2017172104 A1 | 10/2017 |
| WO | 2017200798 A1 | 11/2017 |
| WO | 2018075538 A1 | 4/2018 |
| WO | 2018148090 A1 | 8/2018 |

OTHER PUBLICATIONS

An et al., "Large-Scale Synthesis of High Quality Trigonal Selenium Nanowires" European Journal of Inorganic Chemistry (2003) vol. 17, pp. 3250-3255.

Arai et al., "Versatile supramolecular cross-linker: a rotaxane cross-linker that directly endows vinyl polymers with movable cross-links" Chemistry (2013) vol. 19, pp. 5917-5923.

Buonerba et al., "Novel Synthetic Strategy for the Sulfonation of Polybutadiene and Styrene-Butadiene Copolymers" Macromolecules (2013) vol. 46, pp. 778-784.

Chen et al., "Selenium nanowires and nanotubes synthesized via a facile template-free solution method" Materials Research Bulletin (2010) vol. 45, pp. 699-704.

Choi et al., "Highly elastic binders integrating polyrotaxanes for silicon microparticle anodes in lithium ion batteries" Science (2017) vol. 357, No. 6348, pp. 279-283.

Dwivedi et al., "An Organic Acid-induced Synthesis and Characterization of Selenium Nanoparticles" Journal of Nanotechnology (2011) Article ID 651971, 6 pages.

Elabd et al., "Sulfonation and Characterization of Poly(styrene-isobutylene-styrene) Triblock Copolymers at High Ion-Exchange Capacities" Polymer (2004) vol. 45, pp. 3037-3043.

Fan et al., "Hollow selenium encapsulated into 3D graphene hydrogels for lithium-selenium batteries with high rate performance and cycling stability" RSC Adv. (2017) vol. 7, pp. 21281-21286.

Gao et al., "Hollow Sphere Selenium Nanoparticles: Their In-Vitro Anti Hydroxyl Radical Effect" Advanced Materials (2002), vol. 14, No. 4, pp. 290-293.

Habib et al., "Elastomeric Nanocomposite Based on Exfoliated Graphene Oxide and Its Characteristics without Vulcanization" Hindawi Journal of Nanomaterials (2017) vol. 2017, Article ID 8543137, 11 pages.

Ji et al., "A highly ordered nanostructured carbon-sulphur cathode for lithium-sulphur batteries" Nature Materials (2009) vol. 8, pp. 500-506.

Karlicky et al., "Halogenated Graphenes: Rapidly Growing Family of Graphene Derivatives" ACS Nano (2013) vol. 7, No. 8, pp. 6434-6464.

KR-10-2015-0044333 English language translation.

Li et al., "Mixed Surfactant Template Method for Preparation of Nanometer Selenium" E-Journal of Chemistry (2009) vol. 6, No. S1, pp. S304-S310.

Lin et al., "Observation in the Growth of Selenium Nanoparticles" Journal of Chinese Chemical Society (2004) vol. 51, No. 2, pp. 239-242.

Liu et al., "Solutions for the problems of silicon-carbon anode materials for lithium-ion batteries" Royal Society Open Science (2018) vol. 5, p. 172370.

Luesakul et al., "Shape-controlled synthesis of cubic-like selenium nanoparticles via the self-assembly method" Carbohydrate Polymers (2016) vol. 153, pp. 435-444.

(56) References Cited

OTHER PUBLICATIONS

PCT/US17/18452 International Search Report and Written Opinion dated Apr. 25, 2017, 9 pages.
PCT/US18/16404 International Search Report and Written Opinion dated Apr. 13, 2018, 11 pages.
PCT/US18/16410 International Search Report and Written Opinion dated Apr. 20, 2018, 10 pages.
PCT/US18/16418 International Search Report and Written Opinion dated Apr. 25, 2018, 9 pages.
PCT/US18/16423 International Search Report and Written Opinion dated Apr. 24, 2018, 9 pages.
PCT/US18/16426 International Search Report and Written Opinion dated Apr. 24, 2018, 9 pages.
PCT/US18/16431 International Search Report and Written Opinion dated Apr. 26, 2018, 6 pages.
PCT/US18/20892 International Search Report and Written Opinion dated May 2, 2018, 6 pages.
PCT/US18/25135 International Search Report and Written Opinion dated Jun. 27, 2018, 14 pages.
PCT/US18/25150 International Search Report and Written Opinion dated Jun. 29, 2018, 14 pages.
PCT/US18/25160 International Search Report and Written Opinion dated Nov. 21, 2018, 12 pages.
PCT/US18/25163 International Search Report and Written Opinion dated Jul. 27, 2018, 19 pages.
PCT/US18/43421 International Search Report and Written Opinion dated Oct. 11, 2018, 13 pages.
PCT/US18/43435 International Search Report and Written Opinion dated Jan. 7, 2019, 14 pages.
PCT/US19/18931 International Search Report and Written Opinion dated May 8, 2019, 13 pages.
PCT/US19/19061 International Search Report and Written Opinion dated May 13, 2019, 11 pages.
PCT/US19/19062 International Search Report and Written Opinion dated May 13, 2019, 9 pages.
PCT/US19/20214 International Search Report and Written Opinion dated May 2, 2019, 7 pages.
PCT/US19/20222 International Search Report and Written Opinion dated May 3, 2019, 7 pages.
PCT/US19/21137 International Search Report and Written Opinion dated Jun. 18, 2019, 13 pages.
PCT/US19/27147 International Search Report and Written Opinion dated Aug. 1, 2019, 16 pages.
PCT/US19/36748 International Search Report and Written Opinion dated Oct. 16, 2019, 11 pages.
PCT/US19/37690 International Search Report and Written Opinion dated Oct. 18, 2019, 18 pages.
PCT/US19/37692 International Search Report and Written Opinion dated Oct. 21, 2019, 18 pages.
PCT/US19/37700 International Search Report and Written Opinion dated Oct. 23, 2019, 17 pages.
PCT/US19/38367 International Search Report and Written Opinion dated Oct. 18, 2019, 17 pages.
PCT/US19/38368 International Search Report and Written Opinion dated Oct. 18, 2019, 18 pages.
PCT/US19/38436 International Search Report and Written Opinion dated Oct. 16, 2019, 17 pages.
PCT/US19/38455 International Search Report and Written Opinion dated Oct. 18, 2019, 10 pages.
PCT/US19/38456 International Search Report and Written Opinion dated Oct. 16, 2019, 16 pages.
PCT/US19/38881 International Search Report and Written Opinion dated Oct. 18, 2019, 14 pages.
U.S. Appl. No. 14/999,080 Nonfinal Office Action dated Nov. 9, 2018.
AZO Materials Table of Properties on Styrene Butadiene Rubber, 5 pages.
PCT/US20/14869 International Search Report and Written Opinion dated May 19, 2020, 13 pages.
U.S. Appl. No. 15/442,278 Nonfinal Office Action dated Feb. 28, 2020, 16 pages.
U.S. Appl. No. 15/478,125 Nonfinal Office Action dated Mar. 5, 2020, 11 pages.
U.S. Appl. No. 15/485,934 Nonfinal Office Action dated May 26, 2020, 12 pages.
U.S. Appl. No. 15/676,680 Nonfinal Office Action dated May 20, 2020, 8 pages.
U.S. Appl. No. 15/903,788 Nonfinal Office Action dated Jun. 4, 2020, 11 pages.
U.S. Appl. No. 15/903,808 Final Office Action dated May 15, 2020, 9 pages.
U.S. Appl. No. 15/910,465 Final Office Action dated May 15, 2020, 13 pages.
U.S. Appl. No. 15/910,471 Nonfinal Office Action dated May 13, 2020, 11 pages.
U.S. Appl. No. 15/954,088 Nonfinal Office Action dated Mar. 13, 2020, 9 pages.
U.S. Appl. No. 16/010,213 Nonfinal Office Action dated Mar. 27, 2020, 12 pages.
U.S. Appl. No. 16/010,225 Nonfinal Office Action dated Mar. 27, 2020, 13 pages.
U.S. Appl. No. 16/014,623 Final Office Action dated Apr. 9, 2020, 14 pages.
U.S. Appl. No. 16/112,208 Nonfinal Office Action dated Apr. 2, 2020, 7 pages.
U.S. Appl. No. 16/112,225 Nonfinal Office Action dated May 13, 2020, 9 pages.
U.S. Appl. No. 16/113,676 Final Office Action dated Apr. 9, 2020, 15 pages.
U.S. Appl. No. 16/116,329 Nonfinal Office Action dated Mar. 30, 2020, 6 pages.
U.S. Appl. No. 16/116,341 Nonfinal Office Action dated Mar. 30, 2020, 6 pages.
U.S. Appl. No. 16/120,875 Final Office Action dated Apr. 9, 2020, 14 pages.
U.S. Appl. No. 16/123,218 Final Office Action dated Apr. 9, 2020, 13 pages.
U.S. Appl. No. 16/126,736 Nonfinal Office Action dated Mar. 30, 2020, 6 pages.
U.S. Appl. No. 16/126,745 Nonfinal Office Action dated Mar. 30, 2020, 6 pages.
U.S. Appl. No. 16/160,257 Nonfinal Office Action dated Apr. 3, 2020, 16 pages.
U.S. Appl. No. 16/166,536 Nonfinal Office Action dated May 14, 2020, 5 pages.
U.S. Appl. No. 16/166,574 Final Office Action dated Apr. 9, 2020, 12 pages.
U.S. Appl. No. 16/238,052 Nonfinal Office Action dated Apr. 3, 2020, 14 pages.
U.S. Appl. No. 16/256,346 Nonfinal Office Action dated May 19, 2020, 16 pages.
U.S. Appl. No. 15/434,632 Final Office Action dated Jan. 4, 2021, 20 pages.
U.S. Appl. No. 15/434,632 Nonfinal Office Action dated Jun. 26, 2020, 19 pages.
U.S. Appl. No. 15/442,803 Nonfinal Office Action dated Jul. 20, 2020, 8 pages.
U.S. Appl. No. 15/478,125 Final Office Action dated Sep. 3, 2020, 19 pages.
U.S. Appl. No. 15/483,347 Nonfinal Office Action dated Jun. 17, 2020, 14 pages.
U.S. Appl. No. 15/903,788 Final Office Action dated Feb. 1, 2021, 9 pages.
U.S. Appl. No. 15/903,808 Nonfinal Office Action dated Mar. 19, 2021, 8 pages.
U.S. Appl. No. 15/914,213 Nonfinal Office Action dated Aug. 31, 2020, 8 pages.
U.S. Appl. No. 15/954,046 Nonfinal Office Action dated Nov. 20, 2020, 10 pages.
U.S. Appl. No. 15/954,088 Final Office Action dated Aug. 7, 2020, 8 pages.

(56) References Cited

OTHER PUBLICATIONS

U.S. Appl. No. 16/010,213 Final Office Action dated Aug. 7, 2020, 10 pages.
U.S. Appl. No. 16/010,213 Nonfinal Office Action dated Jan. 6, 2021, 10 pages.
U.S. Appl. No. 16/010,225 Final Office Action dated Jul. 8, 2020, 7 pages.
U.S. Appl. No. 16/109,142 Nonfinal Office Action dated Oct. 13, 2020, 9 pages.
U.S. Appl. No. 16/109,178 Nonfinal Office Action dated Feb. 5, 2021, 11 pages.
U.S. Appl. No. 16/112,225 Final Office Action dated Oct. 1, 2020, 12 pages.
U.S. Appl. No. 16/112,225 Nonfinal Office Action dated Mar. 18, 2021, 10 pages.
U.S. Appl. No. 16/113,676 Nonfinal Office Action dated Dec. 24, 2020, 12 pages.
U.S. Appl. No. 16/114,959 Final Office Action dated Jul. 22, 2020, 6 pages.
U.S. Appl. No. 16/116,329 Final Office Action dated Jul. 23, 2020, 6 pages.
U.S. Appl. No. 16/120,875 Nonfinal Office Action dated Dec. 30, 2020, 14 pages.
U.S. Appl. No. 16/123,218 Nonfinal Office Action dated Dec. 30, 2020, 11 pages.
U.S. Appl. No. 16/126,736 Final Office Action dated Jul. 23, 2020, 6 pages.
U.S. Appl. No. 16/126,745 Final Office Action dated Jul. 23, 2020, 6 pages.
U.S. Appl. No. 16/160,257 Final Office Action dated Oct. 14, 2020, 15 pages.
U.S. Appl. No. 16/160,257 Nonfinal Office Action dated Mar. 26, 2021, 31 pages.
U.S. Appl. No. 16/166,536 Final Office Action dated Nov. 18, 2020, 7 pages.
U.S. Appl. No. 16/166,574 Nonfinal Office Action dated Dec. 30, 2020, 9 pages.
U.S. Appl. No. 16/238,052 Final Office Action dated Oct. 14, 2020, 15 pages.
U.S. Appl. No. 16/238,052 Nonfinal Office Action dated Mar. 26, 2021, 16 pages.
U.S. Appl. No. 16/238,061 Nonfinal Office Action dated Aug. 14, 2020, 8 pages.
U.S. Appl. No. 16/256,321 Final Office Action dated Nov. 3, 2020, 8 pages.
U.S. Appl. No. 16/256,321 Nonfinal Office Action dated Jul. 27, 2020, 8 pages.
U.S. Appl. No. 16/256,346 Final Office Action dated Dec. 8, 2020, 18 pages.
U.S. Appl. No. 16/014,623 Nonfinal Office Action dated Dec. 24, 2020, 11 pages.
U.S. Appl. No. 14/999,080 Nonfinal Office Action dated Oct. 30, 2019, 15 pages.
U.S. Appl. No. 15/442,278 Final Office Action dated Oct. 21, 2019, 16 pages.
U.S. Appl. No. 15/442,803 Nonfinal Office Action dated Dec. 28, 2018, 24 pages.
U.S. Appl. No. 15/442,803 Nonfinal Office Action dated Jul. 25, 2019, 37 pages.
U.S. Appl. No. 15/442,807 Nonfinal Office Action dated Dec. 14, 2018, 7 pages.
U.S. Appl. No. 15/478,125 Final Office Action dated Aug. 23, 2019, 14 pages.
U.S. Appl. No. 15/483,342 Final Office Action dated Mar. 22, 2019, 52 pages.
U.S. Appl. No. 15/483,342 Nonfinal Office Action dated Nov. 2, 2018, 37 pages.
U.S. Appl. No. 15/483,347 Final Office Action dated Apr. 16, 2019, 23 pages.
U.S. Appl. No. 15/483,347 Nonfinal Office Action dated Nov. 2, 2018, 20 pages.
U.S. Appl. No. 15/483,347 Nonfinal Office Action dated Sep. 17, 2019, 20 pages.##.
U.S. Appl. No. 15/483,348 Advisory Action dated Jul. 18, 2019, 9 pages.
U.S. Appl. No. 15/483,348 Final Office Action dated Apr. 9, 2019, 28 pages.
U.S. Appl. No. 15/483,348 Nonfinal Office Action dated Nov. 21, 2018, 22 pages.
U.S. Appl. No. 15/483,348 Nonfinal Office Action dated Sep. 16, 2019, 22 pages.
U.S. Appl. No. 15/901,367 Nonfinal Office Action dated Jun. 10, 2019, 12 pages.
U.S. Appl. No. 15/910,465 Nonfinal Office Action dated Nov. 1, 2019, 12 pages.
U.S. Appl. No. 16/014,623 Nonfinal Office Action dated Oct. 4, 2019, 8 pages.
U.S. Appl. No. 16/113,676 Nonfinal Office Action dated Oct. 4, 2019, 9 pages.
U.S. Appl. No. 16/120,875 Nonfinal Office Action dated Oct. 4, 2019, 10 pages.
U.S. Appl. No. 16/123,218 Nonfinal Office Action dated Oct. 4, 2019, 9 pages.
U.S. Appl. No. 16/166,574 Nonfinal Office Action dated Oct. 4, 2019, 9 pages.
Vaikhanski et al., "Fiber-reinforced composite foam from expandable PVC microspheres" Composites Part A (2003) vol. 34, pp. 1245-1253.
Wikipedia contributors. "Anode." Wikipedia, The Free Encyclopedia, Mar. 4, 2019, Web. Mar. 18, 2019. (Year: 2019).
Wikipedia contributors. "Molar mass distribution." Wikipedia, The Free Encyclopedia, Feb. 1, 2019, Web. Mar. 18, 2019. (Year: 2019).
Xie et al., "A Novel Method for Synthesis of Sulfonated SBS Ionomers by Ring-Opening Reaction of Epoxidized SBS, Their Characterization, Properties, and Blends" Journal of Elastomers and Plastics (2007) vol. 39, pp. 317-334.
Zeng et al., "Solvothermal synthesis of trigonal selenium with butterfly-like microstructure" Particuology (2013) vol. 11, No. 5, pp. 614-617.
Zhang et al., "Synthesis of selenium nanoparticles in the presence of polysaccharides" Materials Letters (2004) vol. 58, No. 21, pp. 2590-2594.
"Nylon" en.wikipedia.org/wiki/Nylon. Accessed Feb. 18, 2020 (Year: 2020).
PCT/US19/47642 International Search Report and Written Opinion dated Dec. 6, 2019, 16 pages.
PCT/US19/48084 International Search Report and Written Opinion dated Dec. 16, 2019, 9 pages.
PCT/US19/55758 International Search Report and Written Opinion dated Jan. 31, 2020, 15 pages.
U.S. Appl. No. 15/434,632 Final Office Action dated Dec. 26, 2019, 20 pages.
U.S. Appl. No. 15/442,803 Final Office Action dated Feb. 24, 2020, 36 pages.
U.S. Appl. No. 15/483,347 Final Office Action dated Dec. 27, 2019, 22 pages.
U.S. Appl. No. 15/483,348 Final Office Action dated Jan. 29, 2020, 9 pages.
U.S. Appl. No. 15/676,677 Nonfinal Office Action dated Feb. 5, 2020, 15 pages.
U.S. Appl. No. 15/903,808 Nonfinal Office Action dated Jan. 28, 2020, 8 pages.
U.S. Appl. No. 15/910,471 Non-final Office Action dated Nov. 8, 2019, 12 pages.
U.S. Appl. No. 15/914,216 Final Office Action dated Dec. 19, 2019, 9 pages.
U.S. Appl. No. 16/010,965 Nonfinal Office Action dated Jan. 8, 2020, 5 pages.
U.S. Appl. No. 16/010,975 Nonfinal Office Action dated Jan. 8, 2020, 5 pages.

(56) References Cited

OTHER PUBLICATIONS

U.S. Appl. No. 16/017,294 Nonfinal Office Action dated Jan. 23, 2020, 6 pages.

* cited by examiner

ENCAPSULATED CATHODE ACTIVE MATERIAL PARTICLES, LITHIUM SECONDARY BATTERIES CONTAINING SAME, AND METHOD OF MANUFACTURING

CROSS REFERENCE TO RELATED APPLICATIONS

The present application is a divisional of U.S. patent application Ser. No. 15/483,342 filed on Apr. 10, 2017, the contents of which are hereby incorporated by reference for all purposes.

FIELD

The present disclosure relates generally to the field of rechargeable lithium battery and, more particularly, to the lithium battery cathode active material, cathode layer, and battery cell, and a method of manufacturing same.

BACKGROUND

A unit cell or building block of a lithium-ion battery is typically composed of an anode current collector, an anode or negative electrode layer (containing an anode active material responsible for storing lithium therein, a conductive additive, and a resin binder), an electrolyte and porous separator, a cathode or positive electrode layer (containing a cathode active material responsible for storing lithium therein, a conductive additive, and a resin binder), and a separate cathode current collector. The electrolyte is in ionic contact with both the anode active material and the cathode active material. A porous separator is not required if the electrolyte is a solid-state electrolyte.

The binder in the anode layer is used to bond the anode active material (e.g. graphite or Si particles) and a conductive filler (e.g. carbon black particles or carbon nanotube) together to form an anode layer of structural integrity, and to bond the anode layer to a separate anode current collector, which acts to collect electrons from the anode active material when the battery is discharged. In other words, in the negative electrode (anode) side of the battery, there are typically four different materials involved: an anode active material, a conductive additive, a resin binder (e.g. polyvinylidine fluoride, PVDF, or styrene-butadiene rubber, SBR), and an anode current collector (typically a sheet of Cu foil). Typically the former three materials form a separate, discrete anode active material layer (or, simply, anode layer) and the latter one forms another discrete layer (current collector layer).

A binder resin (e.g. PVDF or PTFE) is also used in the cathode to bond cathode active materials and conductive additive particles together to form a cathode active layer of structural integrity. The same resin binder also acts to bond this cathode active layer to a cathode current collector (e.g. Al foil).

Historically, lithium-ion batteries actually evolved from rechargeable "lithium metal batteries" that use lithium (Li) metal as the anode and a Li intercalation compound (e.g. $MoS_2$) as the cathode. Li metal is an ideal anode material due to its light weight (the lightest metal), high electronegativity (−3.04 V vs. the standard hydrogen electrode), and high theoretical capacity (3,860 mAh/g). Based on these outstanding properties, lithium metal batteries were proposed 40 years ago as an ideal system for high energy-density applications.

Due to some safety concerns (e.g. lithium dendrite formation and internal shorting) of pure lithium metal, graphite was implemented as an anode active material in place of the lithium metal to produce the current lithium-ion batteries. The past two decades have witnessed a continuous improvement in Li-ion batteries in terms of energy density, rate capability, and safety. However, the use of graphite-based anodes in Li-ion batteries has several significant drawbacks: low specific capacity (theoretical capacity of 372 mAh/g as opposed to 3,860 mAh/g for Li metal), long Li intercalation time (e.g. low solid-state diffusion coefficients of Li in and out of graphite and inorganic oxide particles) requiring long recharge times (e.g. 7 hours for electric vehicle batteries), inability to deliver high pulse power (power density<0.5 kW/kg), and necessity to use pre-lithiated cathodes (e.g. lithium cobalt oxide, as opposed to cobalt oxide), thereby limiting the choice of available cathode materials.

Further, these commonly used cathode active materials have a relatively low specific capacity (typically <220 mAh/g). These factors have contributed to the two major shortcomings of today's Li-ion batteries—a low energy density (typically 150-220 $Wh/kg_{cell}$) and low power density (typically <0.5 kW/kg). In addition, even though the lithium metal anode has been replaced by an intercalation compound (e.g. graphite) and, hence, there is little or no lithium dendrite issue in the lithium-ion battery, the battery safety issue has not gone away. There have been no short of incidents involving lithium-ion batteries catching fire or exploding. To sum it up, battery scientists have been frustrated with the low energy density, inadequate cycle life, and flammability of lithium-ion cells for over three decades!

There have been tremendous efforts made in battery industry and research community to improve existing cathode materials and develop new cathode compositions. However, current and emerging cathode active materials for lithium secondary batteries still suffer from the following serious drawbacks:

(1) The most commonly used cathode active materials (e.g. lithium transition metal oxides) contain a transition metal (e.g. Fe, Mn, Co, Ni, etc.) that is a powerful catalyst that can promote undesirable chemical reactions inside a battery (e.g. decomposition of electrolyte). These cathode active materials also contain a high oxygen content that could assist in the progression of thermal runaway and provide oxygen for electrolyte oxidation, increasing the danger of explosion or fire hazard. This is a serious problem that has hampered the widespread implementation of electric vehicles.

(2) Most of promising organic or polymeric cathode active materials are either soluble in the commonly used electrolytes or are reactive with these electrolytes. Dissolution of active material in the electrolyte results in a continuing loss of the active material. Undesirable reactions between the active material and the electrolyte lead to graduate depletion of the electrolyte and the active material in the battery cell. All these phenomena lead to capacity loss of the battery and shortened cycle life.

(3) The practical capacity achievable with current cathode materials (e.g. lithium iron phosphate and lithium transition metal oxides) has been limited to the range of 150-250 mAh/g and, in most cases, less than 200 mAh/g. Additionally, emerging high-capacity cathode active materials (e.g. $FeF_3$) still cannot deliver a long battery cycle life.

High-capacity cathode active materials, such as metal fluoride, metal chloride, and lithium transition metal silicide, can undergo large volume expansion and shrinkage during the discharge and charge of a lithium battery. These repeated volume changes lead to structural instability of the cathode, breakage of the normally weak bond between the binder resin and the active material, fragmentation of active material particles, delamination between the cathode active material layer and the current collector, and interruption of electron-conducting pathways. These high-capacity cathodes include $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, etc. High-capacity cathode active materials also include a lithium transition metal silicate, $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and $x+y \leq 1$.

Hence, there is an urgent and continuing need for a new cathode active material and a cathode active material layer that enable a lithium secondary battery to deliver a long cycle life and higher energy density. There is also a need for a method of readily and easily producing such a material in large quantities. Thus, it is a primary object of the present disclosure to meet these needs and address the issues associated the rapid capacity decay of a lithium battery.

SUMMARY

Herein reported is a cathode active material layer for a lithium battery that contains a very unique class of cathode active material. Specifically, the cathode active material particles are fully embraced or encapsulated by a high-elasticity polymer (containing an ultra-high molecular weight polymer) that is capable of overcoming the cathode-induced rapid capacity decay problem commonly associated with a rechargeable lithium battery.

The instant disclosure is directed at a lithium-ion battery (using a lithium intercalation compound or conversion-type compound, not lithium metal, as the anode active material) or a lithium metal battery (using lithium metal as the anode active material and a lithium intercalation or conversion compound as the cathode active material, but not including sulfur or alkali metal polysulfide). Both alkali metal-sulfur cells (Li—S, Na—S, and K—S) and the lithium-air cell are excluded from the claims of instant application.

In a preferred embodiment, the disclosure provides a cathode active material particulate for a lithium battery, preferably a rechargeable battery. The cathode active material particulate is composed of one or a plurality of cathode active material particles being fully embraced or encapsulated by a thin layer of a high-elasticity polymer (containing an ultra-high molecular weight polymer) having a recoverable tensile strain from 5% to 200% when measured without an additive or reinforcement, a lithium ion conductivity no less than $10^{-6}$ S/cm at room temperature, and a thickness from 0.5 nm to 10 μm. When measured with an additive or reinforcement in the polymer, the tensile elastic deformation of the resulting composite must remain greater than 2%. The polymer also has a lithium ion conductivity no less than $10^{-6}$ S/cm at room temperature (preferably and more typically no less than $10^{-4}$ S/cm and more preferably and typically no less than $10^{-3}$ S/cm).

The ultrahigh molecular weight (UHMW) polymer is preferably selected from polyacrylonitrile (PAN), polyethylene oxide (PEO), polypropylene oxide (PPO), polyethylene glycol (PEG), polyvinyl alcohol (PVA), polyacrylamide (PAA), poly(methyl methacrylate) (PMMA), poly(methyl ether acrylate) (PMEA), a copolymer thereof, a sulfonated derivative thereof, a chemical derivative thereof, or a combination thereof.

Preferably, the particulates are substantially or essentially spherical or ellipsoidal in shape. Also preferably, the particulate have a diameter or thickness smaller than 30 μm, more preferably smaller than 20 μm, and most preferably smaller than 10 μm.

High-elasticity polymer refers to a polymer that exhibits an elastic deformation of at least 2% (preferably at least 5%) when measured under uniaxial tension. In the field of materials science and engineering, the "elastic deformation" is defined as a deformation of a material (when being mechanically stressed) that is essentially fully recoverable upon release of the load and the recovery process is essentially instantaneous (no or little time delay). Conventionally, such a high elasticity comes from a lightly cross-linked polymer or rubber. In contrast, the instant high-elasticity polymer comes from a thermoplastic polymer (a non-cross-linked polymer or a polymer containing no cross-linked network). This thermoplastic is not a cross-linked polymer. The elastic deformation of instant UHMW polymer is typically and preferably greater than 10%, more preferably greater than 30%, further more preferably greater than 50%, and still more preferably greater than 100%.

The UHMW polymer preferably has a molecular weight from $0.5 \times 10^6$ to less than $5 \times 10^6$ grams/mole, more preferably from $1 \times 10^6$ to less than $3 \times 10^6$ grams/mole for ease of particulate production. The UHMW polymer can have a molecular weight higher than $5 \times 10^6$ g/mole, or even up to $9 \times 10^6$ g/mole. Too high a molecular weight can make it difficult to deposit a thin embracing polymer layer around an active material particle.

In certain embodiments, the ultrahigh molecular weight polymer contains an electrically conductive material dispersed therein. The electrically conducting material may be selected from an electron-conducting polymer, a metal particle or wire, a graphene sheet, a carbon fiber, a graphite fiber, a carbon nano-fiber, a graphite nano-fiber, a carbon nanotube, a graphite particle, an expanded graphite flake, an acetylene black particle, or a combination thereof. The electrically conducting material (e.g. metal nano-wire, nano-fiber, etc.) preferably has a thickness or diameter less than 100 nm.

In certain embodiments, the ultrahigh molecular weight polymer contains a lithium salt and/or a liquid solvent dispersed between chains of the ultrahigh molecular weight polymer.

The liquid solvent dispersed in the UHMW polymer may be preferably selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), propylene carbonate (PC), dimethyl carbonate (DMC), methylethyl carbonate (MEC), diethyl carbonate (DEC), ethyl propionate, methyl propionate, gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, an ionic liquid solvent, or a combination thereof The lithium salt dispersed in the UHMW polymer may be preferably selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphate (LiPF$_3$(CF$_2$CF$_3$)$_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

The cathode active material particulate may contain a cathode active material selected from an inorganic material, an organic material, a polymeric material, or a combination thereof. The inorganic material may be selected from a metal oxide, metal phosphate, metal silicide, metal selenide, transition metal sulfide, or a combination thereof. The inorganic material does not include sulfur or alkali metal polysulfide.

The inorganic material may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

In certain preferred embodiments, the inorganic material is selected from a metal fluoride or metal chloride including the group consisting of CoF$_3$, MnF$_3$, FeF$_3$, VF$_3$, VOF$_3$, TiF$_3$, BiF$_3$, NiF$_2$, FeF$_2$, CuF$_2$, CuF, SnF$_2$, AgF, CuCl$_2$, FeCl$_3$, MnCl$_2$, and combinations thereof. In certain preferred embodiments, the inorganic material is selected from a lithium transition metal silicate, denoted as Li$_2$MSiO$_4$ or Li$_2$Ma$_x$Mb$_y$SiO$_4$, wherein M and Ma are selected from Fe, Mn, Co, Ni, V, or VO; Mb is selected from Fe, Mn, Co, Ni, V, Ti, Al, B, Sn, or Bi; and x+y≤1.

In certain preferred embodiments, the inorganic material is selected from a transition metal dichalcogenide, a transition metal trichalcogenide, or a combination thereof. The inorganic material is selected from TiS$_2$, TaS$_2$, MoS$_2$, NbSe$_3$, MnO$_2$, CoO$_2$, an iron oxide, a vanadium oxide, or a combination thereof.

The cathode active material layer may contain a metal oxide containing vanadium oxide selected from the group consisting of VO$_2$, Li$_x$VO$_2$, V$_2$O$_5$, Li$_x$V$_2$O$_5$, V$_3$O$_8$, Li$_x$V$_3$O$_8$, Li$_x$V$_3$O$_7$, V$_4$O$_9$, Li$_x$V$_4$O$_9$, V$_6$O$_{13}$, Li$_x$V$_6$O$_{13}$, their doped versions, their derivatives, and combinations thereof, wherein 0.1<x<5.

The cathode active material layer may contain a metal oxide or metal phosphate, selected from a layered compound LiMO$_2$, spinel compound LiM$_2$O$_4$, olivine compound LiMPO$_4$, silicate compound Li$_2$MSiO$_4$, Tavorite compound LiMPO$_4$F, borate compound LiMBO$_3$, or a combination thereof, wherein M is a transition metal or a mixture of multiple transition metals.

In some embodiments, the inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The cathode active material layer may contain an organic material or polymeric material selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, Hexaazatrinaphtylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, Li$_4$C$_6$O$_6$, Li$_2$C$_6$O$_6$, Li$_6$C$_6$O$_6$, or a combination thereof.

The thioether polymer is selected from Poly[methanetetryl-tetra(thiomethylene)](PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In other embodiments, the cathode active material layer contains an organic material selected from a phthalocyanine compound, such as copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The cathode active material is preferably in a form of nano particle (spherical, ellipsoidal, and irregular shape), nano wire, nano fiber, nano tube, nano sheet, nano belt, nano ribbon, nano disc, nano platelet, or nano horn having a thickness or diameter less than 100 nm. These shapes can be collectively referred to as "particles" unless otherwise specified or unless a specific type among the above species is desired. Further preferably, the cathode active material has a dimension less than 50 nm, even more preferably less than 20 nm, and most preferably less than 10 nm.

In some embodiments, one particle or a cluster of particles may be coated with or embraced by a layer of carbon disposed between the particle(s) and the high-elasticity polymer layer (the encapsulating shell). Alternatively or additionally, a carbon layer may be deposited to embrace the encapsulated particle or the encapsulated cluster of multiple cathode active material particles.

The particulate may further contain a graphite, graphene, or carbon material mixed with the cathode active material particles and disposed inside the encapsulating or embracing polymer shell. The carbon or graphite material is selected from polymeric carbon, amorphous carbon, chemical vapor deposition carbon, coal tar pitch, petroleum pitch, mesophase pitch, carbon black, coke, acetylene black, activated carbon, fine expanded graphite particle with a dimension smaller than 100 nm, artificial graphite particle, natural graphite particle, or a combination thereof. Graphene may be selected from pristine graphene, graphene oxide, reduced graphene oxide, graphene fluoride, hydrogenated graphene, nitrogenated graphene, functionalized graphene, etc.

The cathode active material particles may be coated with or embraced by a conductive protective coating, selected from a carbon material, graphene, electronically conductive polymer, conductive metal oxide, or conductive metal coating. Preferably, the cathode active material, in the form of a nano particle, nano wire, nano fiber, nano tube, nano sheet, nano belt, nano ribbon, nano disc, nano platelet, or nano horn is pre-intercalated or pre-doped with lithium ions to form a prelithiated anode active material having an amount of lithium from 0.1% to 54.7% by weight of said prelithiated anode active material.

Preferably and typically, the high-elasticity polymer has a lithium ion conductivity no less than $10^{-5}$ S/cm, more preferably no less than $10^{-3}$ S/cm, and most preferably no less than $10^{-2}$ S/cm. Some of the selected polymers exhibit a lithium-ion conductivity greater than $10^{-2}$ S/cm.

In some embodiments, the high-elasticity polymer is a neat UHMW polymer containing no additive or filler dispersed therein. In others, the high-elasticity polymer is polymer matrix composite containing from 0.1% to 50% by weight (preferably from 1% to 35% by weight) of a lithium ion-conducting additive dispersed in an UHMW polymer matrix material. In some embodiments, the high-elasticity polymer contains from 0.1% by weight to 10% by weight of a reinforcement nano filament selected from carbon nano-tube, carbon nano-fiber, graphene, or a combination thereof.

In some embodiments, the UHMW polymer is mixed with an elastomer (to form a blend, co-polymer, or interpenetrating network) selected from natural polyisoprene (e.g. cis-1, 4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

In some embodiments, the high-elasticity polymer is a composite containing a lithium ion-conducting additive dispersed in an UHMW polymer matrix material, wherein the lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

The UHMW polymer may form a mixture, blend, co-polymer, or semi-interpenetrating network (semi-IPN) with an electron-conducting polymer selected from polyaniline, polypyrrole, polythiophene, polyfuran, a bi-cyclic polymer, derivatives thereof (e.g. sulfonated versions), or a combination thereof.

In some embodiments, the UHMW polymer may form a mixture, blend, or semi-IPN with a lithium ion-conducting polymer selected from poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a sulfonated derivative thereof, or a combination thereof. Sulfonation is herein found to impart improved lithium ion conductivity to a polymer.

The present disclosure also provides a cathode electrode that contains the presently invented high-elasticity polymer-encapsulated cathode active material particles, and an optional conductive additive (e.g. expanded graphite flakes, carbon black, acetylene black, or carbon nanotube), an optional resin binder (typically required).

The present disclosure also provides a lithium battery containing an optional anode current collector, an anode active material layer, an invented cathode active material layer as described above, an optional cathode current collector, an electrolyte in ionic contact with the anode active material layer and the cathode active material layer and an optional porous separator. The lithium battery may be a lithium-ion battery or lithium metal battery (containing lithium metal or lithium alloy as the main anode active material and containing no intercalation-based anode active material), including lithium-selenium battery, but excluding alkali metal-sulfur battery and lithium-air battery for defining the claims.

The present disclosure also provides a method of manufacturing a lithium battery. The method includes (a) providing a cathode active material layer and an optional cathode current collector to support the cathode active material layer; (b) providing an anode active material layer and an optional anode current collector to support the anode active material layer; and (c) providing an electrolyte in contact with the anode active material layer and the cathode active material layer and an optional separator electrically isolating (separating) the anode and the cathode; wherein the operation of providing the cathode active material layer includes fully embracing or encapsulating particles of a cathode active material by a high-elasticity polymer (containing an ultra-high molecular weight polymer) to form protected particulates, wherein the high-elasticity polymer has a recoverable tensile elastic strain from 2% to 200% (preferably >5% when measured without an additive or reinforcement), a lithium ion conductivity no less than $10^{-6}$ S/cm at room temperature, and a thickness from 0.5 nm to 10 μm (preferably from 1 to 100 nm).

This high-elasticity polymer encapsulation layer appears to be capable of isolating (preventing) liquid electrolyte from being in direct physical contact with the cathode active material and, thus, preventing the catalytic elements (e.g. Fe, Mn, Ni, Co, etc.) in the cathode active material from catalyzing the decomposition of the electrolyte. This otherwise could cause fast capacity decay and fire and explosion hazard. This high-elasticity polymer encapsulation layer also prevents dissolution of an organic or polymeric active material in the liquid electrolyte, which otherwise would lead to continuing loss of the active material and, thus, loss in capacity.

Preferably, the high-elasticity polymer has a lithium ion conductivity from $1\times10^{-5}$ S/cm to $5\times10^{-2}$ S/cm. In some embodiments, the high-elasticity polymer has a recoverable tensile strain from 10% to 200% (more preferably >30%, and further more preferably >50%).

In certain embodiments, the operation of providing a high-elasticity polymer contains providing a mixture/blend/composite of an ultra-high molecular weight polymer with an elastomer, an electronically conductive polymer (e.g. polyaniline, polypyrrole, polythiophene, polyfuran, a bi-cyclic polymer, a sulfonated derivative thereof, or a combination thereof), a lithium-ion conducting material, a reinforcement material (e.g. carbon nanotube, carbon nano-fiber, and/or graphene), or a combination thereof.

In this mixture/blend/composite, the lithium ion-conducting material is dispersed in the high-elasticity polymer and is preferably selected from $Li_2CO_3$, $Li_2O$, $Li_2C_2O_4$, LiOH, LiX, $ROCO_2Li$, $HCOLi$, $ROLi$, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

In some embodiments, the lithium ion-conducting material is dispersed in the high-elasticity polymer and is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

Preferably, the cathode active material particles are coated with a layer of carbon or graphene prior to being embraced by the high-elasticity polymer. Preferably, cathode active material particles and particles of a carbon or graphite material are bonded together by the high-elasticity polymer. Preferably, the cathode active material particles, possibly along with a carbon or graphite material and/or with some internal graphene sheets, are embraced by graphene sheets to form cathode active material particulates, which are then encapsulated by the high-elasticity polymer. The graphene sheets may be selected from pristine graphene (e.g. that prepared by CVD or liquid phase exfoliation using direct ultrasonication), graphene oxide, reduced graphene oxide (RGO), graphene fluoride, doped graphene, functionalized graphene, etc.

DESCRIPTION OF THE PREFERRED EMBODIMENTS

This disclosure is directed at the cathode active material layer (positive electrode layer, not including the cathode current collector) containing a cathode active material in a protected particulate form for a lithium secondary battery, which is preferably a secondary battery based on a non-aqueous electrolyte, a polymer gel electrolyte, an ionic liquid electrolyte, a quasi-solid electrolyte, or a solid-state electrolyte. The shape of a lithium secondary battery can be cylindrical, square, button-like, etc. The present disclosure is not limited to any battery shape or configuration or any type of electrolyte. The disclosure also provides such a protected cathode particulate composed of cathode active material particles encapsulated or embraced by a thin layer of a high-elasticity polymer containing an ultra-high molecular weight polymer.

Figure 1A:
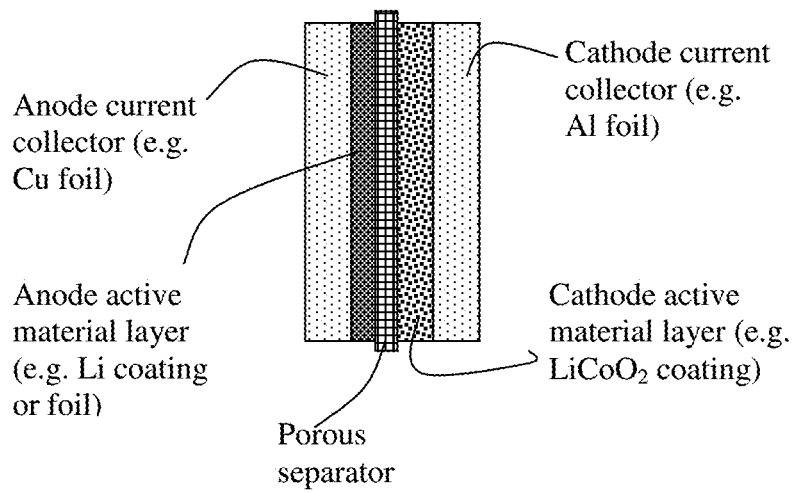
FIG. 1(A) Schematic of a prior art lithium-ion battery cell, wherein the anode layer is a thin coating of an anode active material (Li or lithiated Si) and the cathode is composed of particles of a cathode active material, a conductive additive (not shown) and a resin binder (not shown).
Figure 1B:
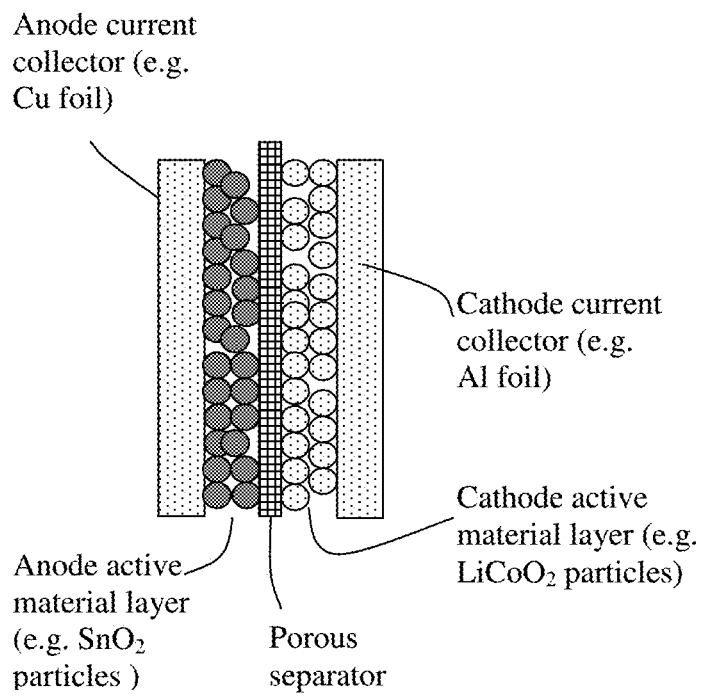
FIG. 1(B) Schematic of another prior art lithium-ion battery; the anode layer being composed of particles of an anode active material, a conductive additive (not shown) and a resin binder (not shown).

As illustrated in FIG. 1(B), a lithium-ion battery cell is typically composed of an anode current collector (e.g. Cu foil), an anode or negative electrode active material layer (i.e. anode layer typically containing particles of an anode active material, conductive additive, and binder), a porous separator and/or an electrolyte component, a cathode or positive electrode active material layer (containing a cathode active material, conductive additive, and resin binder), and a cathode current collector (e.g. Al foil). More specifically, the anode layer is composed of particles of an anode active material (e.g. graphite, Sn, $SnO_2$, or Si), a conductive additive (e.g. carbon black particles), and a resin binder (e.g. SBR or PVDF). This anode layer is typically 50-300 μm thick (more typically 100-200 μm) to give rise to a sufficient amount of current per unit electrode area. Similarly, the cathode layer is composed of particles of a cathode active material (e.g. $LiCoO_2$, $LiMnO_4$, $LiFePO_4$, etc.), a conductive additive (e.g. carbon black particles), and a resin binder (e.g. PVDF or PTFE). This cathode layer is typically 100-300 μm thick.

In a lithium metal cell, as illustrated in FIG. 1(A), the anode active material is deposited in a thin film form or a thin foil form directly onto an anode current collector. If a layer of Li coating or Li foil is used as the anode active material, the battery is a lithium metal battery, lithium sulfur battery, lithium-air battery, lithium-selenium battery, etc.

In order to obtain a higher energy density lithium-ion cell, the anode in FIG. 1(B) can be designed to contain higher-capacity anode active materials having a composition formula of $Li_aA$ (A is a metal or semiconductor element, such as Al and Si, and "a" satisfies $0<a\leq5$). These materials are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g).

Figure 2A:
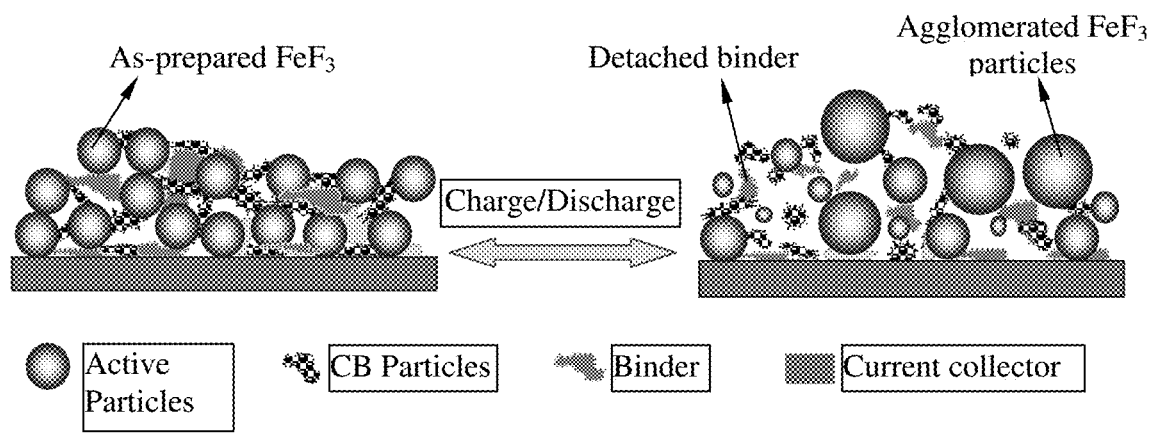
FIG. 2(A) Schematic illustrating the notion that expansion/shrinkage of electrode active material particles, upon lithium insertion and de-insertion during discharge/charge of a prior art lithium-ion battery, can lead to detachment of resin binder from the particles, interruption of the conductive paths formed by the conductive additive, and loss of contact with the current collector.

As schematically illustrated in FIG. 2(A), one major problem in the current lithium battery is the notion that active material particles can get fragmented and the binder resin can detach from both the active material particles and conductive additive particles due to volume expansion/shrinkage of the active material particles during the charge and discharge cycles. These binder detachment and particle fragmentation phenomena lead to loss of contacts between active material particles and conductive additives and loss of contacts between the anode active material and its current collector. These adverse effects result in a significantly shortened charge-discharge cycle life.

We have solved these challenging issues that have troubled battery designers and electrochemists alike for more than 30 years by developing a new class of cathode active materials. The cathode active material layer comprises multiple cathode active material particles that are fully embraced or encapsulated by a high-elasticity polymer (containing an UHMW polymer) having a recoverable (elastic) tensile strain no less than 2% under uniaxial tension and a lithium ion conductivity no less than $10^{-6}$ S/cm at room temperature (preferably and more typically from $1\times10^{-5}$ S/cm to $5\times10^{-2}$ S/cm).

Figure 2B:
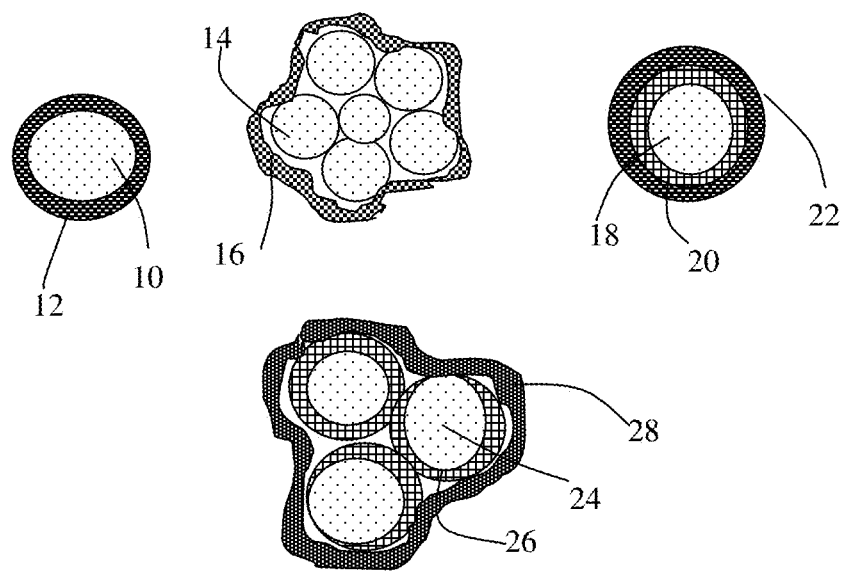
FIG. 2(B) Several different types of particulates containing high-elasticity polymer encapsulated cathode active material particles.

As illustrated in FIG. 2(B), the present disclosure provides four major types of particulates of high-elasticity polymer-encapsulated cathode active material particles. The first one is a single-particle particulate containing a cathode active material core 10 encapsulated by a high-elasticity polymer shell 12. The second is a multiple-particle particulate containing multiple cathode active material particles 14 (e.g. $FeF_3$ particles), optionally along with other conductive materials (e.g. particles of graphite or hard carbon, not shown), which are encapsulated by a high-elasticity polymer 16. The third is a single-particle particulate containing a cathode active material core 18 coated by a carbon or graphene layer 20 (or other conductive material) further encapsulated by a high-elasticity polymer 22. The fourth is a multiple-particle particulate containing multiple cathode active material particles 24 (e.g. $FeF_3$ particles) coated with a conductive protection layer 26 (carbon, graphene, etc.), optionally along with other active materials or conductive additive, which are encapsulated by a high-elasticity polymer shell 28.

High-elasticity polymer refers to a polymer that exhibits an elastic deformation of at least 2% when measured under uniaxial tension. In the field of materials science and engineering, the "elastic deformation" is defined as a deformation of a material (when being mechanically stressed) that is essentially fully recoverable and the recovery is essentially instantaneous upon release of the load. The elastic deformation is preferably greater than 5%, more preferably greater than 10%, further more preferably greater than 50%, and still more preferably greater than 100%. The preferred types of high-capacity polymers will be discussed later.

The application of the presently invented high-elasticity polymer encapsulation approach is not limited to any particular class of cathode active materials. The cathode active material layer may contain a cathode active material selected from an inorganic material, an organic material, a polymeric material, or a combination thereof. The inorganic material may be selected from a metal oxide, metal phosphate, metal silicide, metal selenide, transition metal sulfide, or a combination thereof.

The inorganic material may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

In certain preferred embodiments, the inorganic material is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, and combinations thereof. In certain preferred embodiments, the inorganic material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and $x+y\leq1$.

In certain preferred embodiments, the inorganic material is selected from a transition metal dichalcogenide, a transition metal trichalcogenide, or a combination thereof. The inorganic material is selected from $TiS_2$, $TaS_2$, $MoS_2$, $NbSe_3$, $MnO_2$, $CoO_2$, an iron oxide, a vanadium oxide, or a combination thereof.

The cathode active material layer may contain a metal oxide containing vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$.

The cathode active material layer may contain a metal oxide or metal phosphate, selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In some embodiments, the inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The cathode active material layer may contain an organic material or polymeric material selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]n$), lithiated 1,4,5,8-naphthalenetetraol formaldehyde polymer, Hexaazatrinaphtylene (HATN), Hexaazatriphenylene hexacarbonitrile ($HAT(CN)_6$), 5-Benzylidene hydantoin, Isatine lithium salt, Pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

The thioether polymer is selected from Poly[methanetetryl-tetra(thiomethylene)](PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4, 5-tetrakis(propylthio)benzene] (PTKPTB, or poly[3,4(ethylenedithio)thiophene] (PEDTT).

In other embodiments, the cathode active material layer contains an organic material selected from a phthalocyanine compound, such as copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The particles of the anode active material may be in the form of a nano particle, nano wire, nano fiber, nano tube, nano sheet, nano platelet, nano disc, nano belt, nano ribbon, or nano horn. They can be non-lithiated (when incorporated into the anode active material layer) or pre-lithiated to a desired extent (up to the maximum capacity as allowed for a specific element or compound.

Preferably and typically, the high-elasticity polymer has a lithium ion conductivity no less than $10^{-5}$ S/cm, more preferably no less than $10^{-4}$ S/cm, further preferably no less than $10^{-3}$ S/cm, and most preferably no less than $10^{-2}$ S/cm. In some embodiments, the high-elasticity polymer is a neat polymer having no additive or filler dispersed therein. In others, the high-elasticity polymer is a polymer matrix composite containing from 0.1% to 50% (preferably 1% to 35%) by weight of a lithium ion-conducting additive dispersed in an UHMW polymer matrix material. The high-elasticity polymer must have a high elasticity (elastic deformation strain value >2%). An elastic deformation is a deformation that is fully recoverable and the recovery process is essentially instantaneous (no significant time delay). The high-elasticity polymer can exhibit an elastic deformation from 5% up to 300% (3 times of its original length), more typically from 10% to 200%, and further more typically from 30% to 100%. It may be noted that although a metal typically has a high ductility (i.e. can be extended to a large extent without breakage), the majority of the deformation is plastic deformation (non-recoverable) and only a small amount of elastic deformation (typically <1% and more typically <0.2%).

In some preferred embodiments, the high-elasticity polymer contains a select group of ultra-high molecular weight polymers that exhibit a unique combination of a high elasticity (high elastic deformation strain) and high lithium-ion conductivity. These UHMW polymers can contain a lithium salt to further increase the lithium ion conductivity. An UHMW polymer may also contain an electron-conducting material dispersed therein. Thus, the high-elasticity is preferably lithium ion-conducting and electron-conducting.

In certain preferred embodiments, the high-elasticity polymer contains an ultrahigh molecular weight (UHMW) polymer preferably selected from UHMW polyacrylonitrile (UHMW PAN), polyethylene oxide (UHMW PEO), polypropylene oxide (UHMW PPO), polyethylene glycol (UHMW PEG), polyvinyl alcohol (UHMW PVA), polyacrylamide (UHMW PAA), poly(methyl methacrylate) (UHMW PMMA), poly(methyl ether acrylate) (UHMW PMEA), a copolymer thereof, a sulfonated derivative thereof, a chemical derivative thereof, or a combination thereof.

The first step for producing encapsulated active material particles is to dissolve a UHMW polymer in a solvent to form a solution. Subsequently, particles of a cathode active material (e.g. lithium metal oxide, lithium metal fluoride, etc.) can be dispersed in a polymer-solvent solution to form a suspension (also referred to as dispersion or slurry) of an active material particle-polymer mixture. This suspension can then be subjected to a solvent removal treatment while individual particles remain substantially separated from one another. The polymer precipitates out to deposit on surfaces of these active material particles. This can be accomplished, for instance, via spray drying, ultrasonic spraying, air-assisted spraying, aerosolization, and other secondary particle formation procedures. These techniques will be discussed later.

One may also choose to add some lithium salt into the slurry. For instance, the procedure may begin with dissolving UHMW PVA in a liquid solvent to form a solution. A lithium salt, $LiPF_6$, can then be added into the solution at a desired weight percentage. Then, particles of a selected cathode active material are introduced into the mixture solution to form a slurry. The slurry may then be subjected to a micro-encapsulation procedure to produce cathode active material particles coated with an embracing layer of UHMW PVA containing $LiPF_6$ dispersed therein (in the amorphous zones of the polymer).

The aforementioned high-elasticity polymers may be used alone to encapsulate the cathode active material particles. Alternatively, the UHMW polymer can be mixed with a broad array of elastomers, electrically conducting polymers, lithium ion-conducting materials, and/or strengthening materials (e.g. carbon nanotube, carbon nano-fiber, or graphene sheets).

A broad array of elastomers can be mixed with an UHMW polymer to form a blend, co-polymer, or interpenetrating network that encapsulates the cathode active material particles. The elastomeric material may be selected from natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

In some embodiments, an UHMW polymer can form a polymer matrix composite containing a lithium ion-conducting additive dispersed in the high-elasticity polymer matrix material, wherein the lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

In some embodiments, the UHMW polymer can be mixed with a lithium ion-conducting additive, which contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (Li-BETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

The UHMW polymer may form a mixture, blend, or semi-interpenetrating network with an electron-conducting polymer selected from polyaniline, polypyrrole, polythiophene, polyfuran, a bi-cyclic polymer, derivatives thereof (e.g. sulfonated versions), or a combination thereof. In some embodiments, the UHMW polymer may form a mixture, co-polymer, or semi-interpenetrating network with a lithium ion-conducting polymer selected from poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a derivative thereof (e.g. sulfonated versions), or a combination thereof.

Unsaturated rubbers that can be mixed with the UHMW polymer include natural polyisoprene (e.g. cis-1,4-polyisoprene natural rubber (NR) and trans-1,4-polyisoprene guttapercha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), Saturated rubbers and related elastomers in this category include EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, and protein elastin. Polyurethane and its copolymers (e.g. urea-urethane copolymer) are particularly useful elastomeric shell materials for encapsulating active material particles.

Several micro-encapsulation processes may be used to encapsulate particles of an active material. These processes typically require the high-elasticity polymer or its precursor (monomer or oligomer) to be dissolvable in a solvent. Fortunately, all the UHMW polymers or their precursors used herein are soluble in some common solvents. The polymer or its precursor can be readily dissolved in a common organic solvent to form a solution. This solution can then be used to encapsulate solid particles via several of the micro-encapsulation methods to be discussed in what follows. Upon encapsulation, the polymer shell is then polymerized.

There are three broad categories of micro-encapsulation methods that can be implemented to produce high-elasticity polymer-encapsulated particles of an active material: physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

Pan-coating method: The pan coating process involves tumbling the active material particles in a pan or a similar device while the encapsulating material (e.g. monomer/oligomer, polymer melt, polymer/solvent solution) is applied slowly until a desired encapsulating shell thickness is attained.

Air-suspension coating method: In the air suspension coating process, the solid particles (core material) are dispersed into the supporting air stream in an encapsulating chamber. A controlled stream of a polymer-solvent solution (polymer or its monomer or oligomer dissolved in a solvent; or its monomer or oligomer alone in a liquid state) is concurrently introduced into this chamber, allowing the solution to hit and coat the suspended particles. These suspended particles are encapsulated (fully coated) with a polymer or its precursor molecules while the volatile solvent is removed, leaving a very thin layer of polymer (or its precursor, which is cured/hardened subsequently) on surfaces of these particles. This process may be repeated several times until the required parameters, such as full-coating thickness (i.e. encapsulating shell or wall thickness), are achieved. The air stream which supports the particles also helps to dry them, and the rate of drying is directly proportional to the temperature of the air stream, which can be adjusted for optimized shell thickness.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal extrusion: Particles of an active material may be encapsulated using a rotating extrusion head containing concentric nozzles. In this process, a stream of core fluid (slurry containing particles of an active material dispersed in a solvent) is surrounded by a sheath of shell solution or melt. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational nozzle method: Core-shell encapsulation or matrix-encapsulation of an active material can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the active material. The solidification can be done according to the used gelation system with an internal gelation (e.g. sol-gel processing, melt) or an external (additional binder system, e.g. in a slurry).

Spray-drying: Spray drying may be used to encapsulate particles of an active material when the active material is dissolved or suspended in a melt or polymer solution. In spray drying, the liquid feed (solution or suspension) is atomized to form droplets which, upon contacts with hot gas, allow solvent to get vaporized and thin polymer shell to fully embrace the solid particles of the active material.

Coacervation-phase separation: This process consists of three steps carried out under continuous agitation:
(a) Formation of three immiscible chemical phases: liquid manufacturing vehicle phase, core material phase and encapsulation material phase. The core material is dispersed in a solution of the encapsulating polymer (or its monomer or oligomer). The encapsulating material phase, which is an immiscible polymer in liquid state, is formed by (i) changing temperature in polymer solution, (ii) addition of salt, (iii) addition of non-solvent, or (iv) addition of an incompatible polymer in the polymer solution.
(b) Deposition of encapsulation shell material: core material being dispersed in the encapsulating polymer solution, encapsulating polymer material coated around core particles, and deposition of liquid polymer embracing around core particles by polymer adsorbed at the interface formed between core material and vehicle phase; and
(c) Hardening of encapsulating shell material: shell material being immiscible in vehicle phase and made rigid via thermal, cross-linking, or dissolution techniques.

Interfacial polycondensation and interfacial cross-linking: Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A solution of the active material and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form a polymer shell material.

In-situ polymerization: In some micro-encapsulation processes, active materials particles are fully coated with a monomer or oligomer first. Then, direct polymerization and cross-linking of the monomer or oligomer is carried out on the surfaces of these material particles.

Matrix polymerization: This method involves dispersing and embedding a core material in a polymeric matrix during formation of the particles. This can be accomplished via spray-drying, in which the particles are formed by evaporation of the solvent from the matrix material. Another possible route is the notion that the solidification of the matrix is caused by a chemical change.

In the following examples, UHMW PEO, UHMW PPO, and UHMW PAN were used as three examples of UHMW polymers to illustrate the best mode of practice. Other UHMW polymers can be similarly used. These should not be construed as limiting the scope of disclosure.

Example 1: Cathode Active Material Layers Containing High-Elasticity UHMW Polymer-Encapsulated $V_2O_5$ Particles Cathode active material layers were prepared from $V_2O_5$ particles and graphene-embraced $V_2O_5$ particles, respectively. $V_2O_5$ particles were commercially available. Graphene-embraced $V_2O_5$ particles were prepared in-house. In a typical experiment, vanadium pentoxide gels were obtained by mixing $V_2O_5$ in a LiCl aqueous solution. The $Li^+$-exchanged gels obtained by interaction with LiCl solution (the Li:V molar ratio was kept as 1:1) was mixed with a GO suspension and then placed in a Teflon-lined stainless steel 35 ml autoclave, sealed, and heated up to 180° C. for 12 h. After such a hydrothermal treatment, the green solids were collected, thoroughly washed, ultrasonicated for 2 minutes, and dried at 70° C. for 12 h followed by mixing with another 0.1% GO in water, ultrasonicating to break down nano-belt sizes, and then spray-drying at 200° C. to obtain graphene-embraced $V_2O_5$ composite particulates.

Selected amounts of $V_2O_5$ particles and graphene-embraced $V_2O_5$ particles, respectively, were then each made into UHMW PEO-based high-elasticity polymer-encapsulated particulates according to the following procedure:

UHMW PEO was dissolved in DI-water (1.6 wt. %) to form a homogenous and clear solution first. Then, two routes were followed to prepare polymer-encapsulated $V_2O_5$ particles and graphene-embraced $V_2O_5$ particles. In the first route, $V_2O_5$ particles and graphene-embraced $V_2O_5$ particles, respectively, were dispersed in the UHMW PEO-water solution to form a slurry. In some samples, 0.5%-5% of a conductive filler (e.g. graphene sheets) was added into the slurry. The slurries were separately spray-dried to form particulates of polymer-encapsulated $V_2O_5$ and graphene-embraced $V_2O_5$ particles.

In the second route, 1-45% of lithium salt ($LiClO_4$) was dissolved in the solution to form a series of lithium-salt containing solutions. Then, $V_2O_5$ particles or graphene-embraced $V_2O_5$ particles were dispersed in the lithium-containing UHMW PEO-water solution to form a series of slurries. In some samples, 0.5%-5% of a conductive filler (e.g. graphene sheets) was added into the slurry. Each slurry was spray-dried to form particulates of polymer- or polymer/lithium salt-encapsulated $V_2O_5$ or graphene-embraced $V_2O_5$ particles. The polymer or polymer/lithium salt shell can contain some conducting material (graphene sheets, in this case).

Some of the particulate samples were subsequently soaked in a solvent (preferably a desired lithium-ion battery electrolyte solvent such as ethylene carbonate, EC), allowing the solvent to permeate into the amorphous zones of the polymer phase embracing the anode particles. The UHMW polymer shell thickness was varied from 356 nm to 1.66 μm.

Figure 3A:
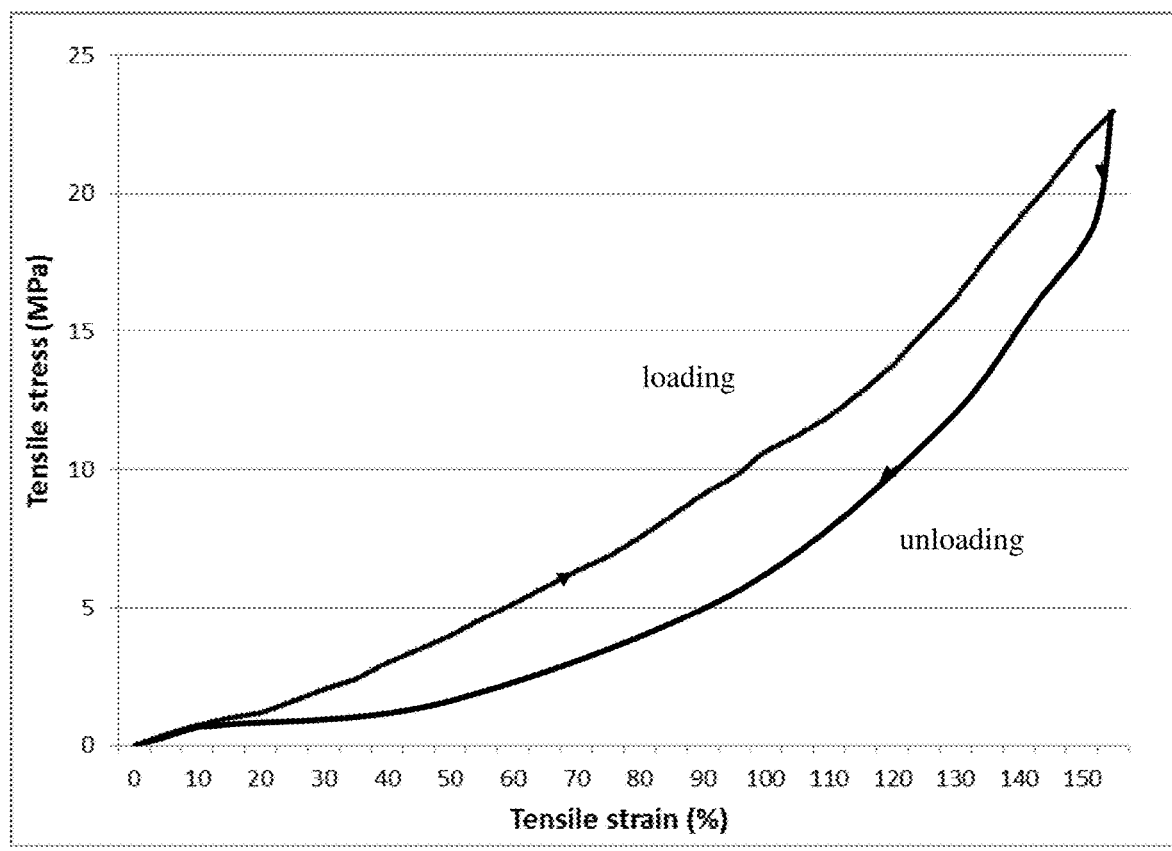
FIG. 3(A) The representative tensile stress-strain curve of an UHMW PEO-EC polymer.

UHMW PEO-water solution was also cast onto glass surface and dried to form PEO films. Upon thorough drying, the polymer films were soaked in a desired solvent (e.g. EC) to form a rubber-like polymer. Several tensile testing specimens were cut from each polymer film containing a solvent (e.g. EC) and tested with a universal testing machine. The representative tensile stress-strain curves of polymers are shown in FIG. 3(A), which indicate that this polymer has an elastic deformation of approximately 150%. This value is for a neat polymer (containing some solvent) without any solid additive (no lithium salt and no conductive additive). The addition of up to 30% by weight of a lithium salt typically reduces this elasticity down to a reversible tensile strain from 5% to 60%.

For electrochemical testing, a comparative electrode using a conventional cathode (no encapsulation) was also prepared. The working electrodes were prepared by mixing 85 wt. % $V_2O_5$ or 88% of graphene-embraced $V_2O_5$ particles, 5-8 wt. % CNTs, and 7 wt. % polyvinylidene fluoride (PVDF) binder dissolved in N-methyl-2-pyrrolidinoe (NMP) to form a slurry of 5 wt. % total solid content. After coating the slurries on Al foil, the electrodes were dried at 120° C. in vacuum for 2 h to remove the solvent before pressing. Then, the electrodes were cut into a disk (ϕ=12 mm) and dried at 100° C. for 24 h in vacuum.

Electrochemical measurements were carried out using CR2032 (3V) coin-type cells with lithium metal as the counter/reference electrode, Celgard 2400 membrane as separator, and 1 M $LiPF_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using a CH-6 electrochemical workstation at a scanning rate of 1 mV/s. The electrochemical performance of the cell featuring high-elasticity polymer binder and that containing PVDF binder were evaluated by galvanostatic charge/discharge cycling at a current density of 50 mA/g using an Arbin electrochemical workstation.

Figure 3B:
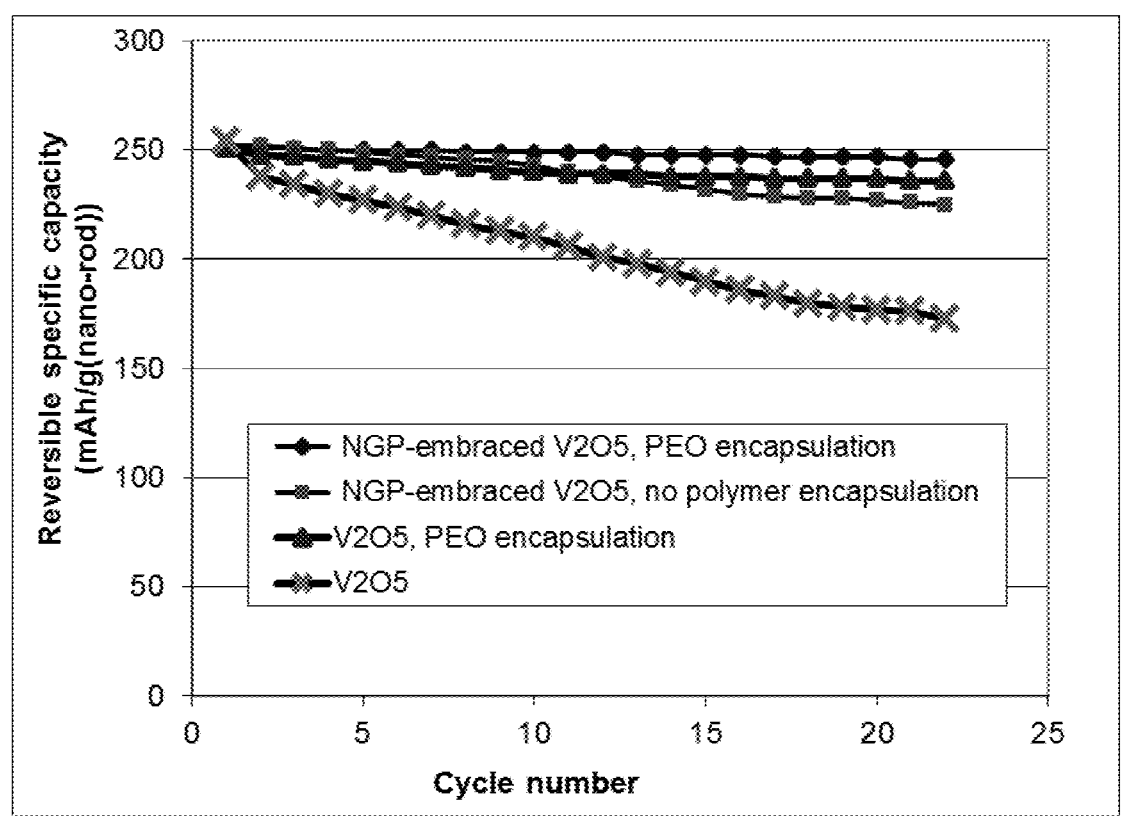
FIG. 3(B) The specific intercalation capacity curves of four lithium cells: cathode containing un-encapsulated $V_2O_5$ particles, cathode containing un-encapsulated but graphene-embraced $V_2O_5$ particles, cathode containing UHMW PEO-encapsulated $V_2O_5$ particles, and cathode containing UHMW PEO-encapsulated graphene-embraced $V_2O_5$ particles.

Summarized in FIG. 3(B) are the specific intercalation capacity curves of four lithium cells: cathode containing un-encapsulated $V_2O_5$ particles, cathode containing un-encapsulated but graphene-embraced $V_2O_5$ particles, cathode containing UHMW PEO polymer-encapsulated $V_2O_5$ particles, and cathode containing UHMW PEO polymer-encapsulated graphene-embraced $V_2O_5$ particles. As the number of cycles increases, the specific capacity of the un-encapsulated $V_2O_5$ electrode drops at the fastest rate. In contrast, the presently invented UHMW PEO polymer encapsulation provides the battery cell with a significantly more stable and high specific capacity for a large number of cycles. These data have clearly demonstrated the surprising and superior performance of the presently invented UHMW polymer encapsulation approach.

The high-elasticity UHMW polymer encapsulation shell appears to be capable of reversibly deforming to a great extent without breakage when the active material particles expand and shrink. The polymer also remains chemically bonded to the binder resin when the encapsulated particles expand or shrink. In contrast, the PVDF binder is broken or detached from some of the non-encapsulated active material particles. These were observed by using SEM to examine the surfaces of the electrodes recovered from the battery cells after some numbers of charge-discharge cycles.

Example 2: High-Elasticity Polymer Binder-Bonded Lithium Iron Phosphate (LFP) Particles The high-elasticity polymer for encapsulation of LFP particles was based on ultra-high molecular weight polyacrylonitrile (UHMW PAN). UHMW PAN (0.3 g) was dissolved in 5 ml of dimethylformamide (DMF) to form a solution. The LFP particles were then dispersed in the solution to form a slurry. The slurries were then separately subjected to a micro-encapsulation procedure to produce anode active material particles having entire exterior surfaces being coated with an embracing layer of the polymers.

Figure 4A:
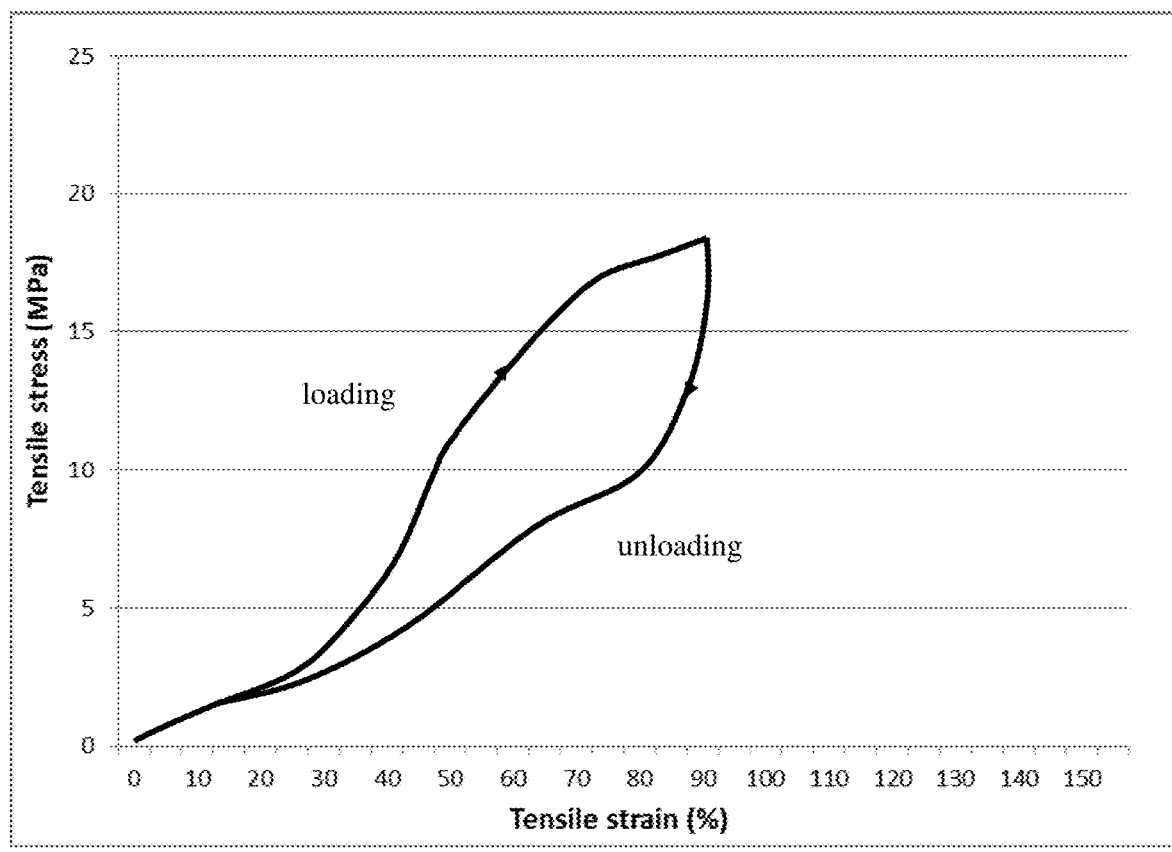
FIG. 4(A) Representative tensile stress-strain curves of UHMW PAN/PC polymer film.

Polymer films for elasticity testing were cast from the prepared solutions on a glass support, followed by solvent evaporation at 70° C. under a fume hood. To remove the traces of DMF, the films were thoroughly dried in a vacuum (<1 Torr) at 70° C. for 48 h. The polymer films were soaked in propylene carbonate (PC) to form PC-plasticized UHMW PAN films. Tensile testing was also conducted on these films and some testing results are summarized in FIG. 4(A). This series of polymers can be elastically stretched up to approximately 80%.

Figure 4B:
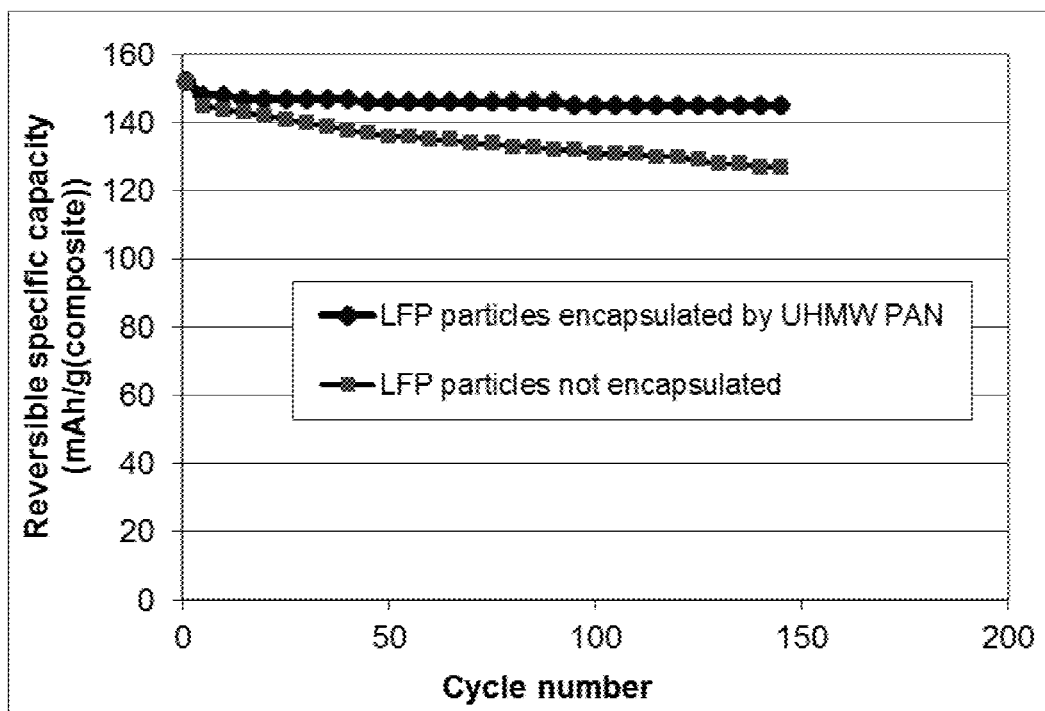
FIG. 4(B) The specific capacity values of two lithium battery cells having a cathode active material featuring (1) high-elasticity UHMW PAN/PC-encapsulated carbon-coated $LiFePO_4$ particles and (2) carbon-coated $LiFePO_4$ particles without polymer encapsulation, respectively.

The battery cells from the high-elasticity polymer-encapsulated carbon-coated LFP particles and non-encapsulated carbon-coated LFP particles were prepared using a procedure similar to that described in Example 1. FIG. 4(B) shows that the cathode prepared according to the presently invented high-elasticity polymer encapsulation approach offers a significantly more stable cycling behavior and higher reversible capacity compared to the non-encapsulated LFP particle-based cathode. The high-elasticity polymer is more capable of holding the active material particles and conductive additive together, significantly improving the structural integrity of the active material electrode. The high-elasticity polymer also acts to isolate the electrolyte from the active material yet still allowing for easy diffusion of lithium ions.

Example 3: Metal Fluoride Nano Particles Encapsulated by an UHMW PPO

For encapsulation of $FeF_3$ nano particles, an UHMW PPO polymer was implemented as an embracing polymer shell by using a procedure similar to that described in Example 1. Commercially available powders of $CoF_3$, $MnF_3$, $FeF_3$, $VF_3$, $VOF_3$, $TiF_3$, and $BiF_3$ were subjected to high-intensity ball-milling to reduce the particle size down to approximately 0.5-2.3 am. Each type of these metal fluoride particles, along with graphene sheets (as a conductive additive), was then added into a UHMW PPO-solvent liquid suspension to form a multiple-component slurry. The slurry was then spray-dried to form isolated polymer embraced particles.

Figure 5:
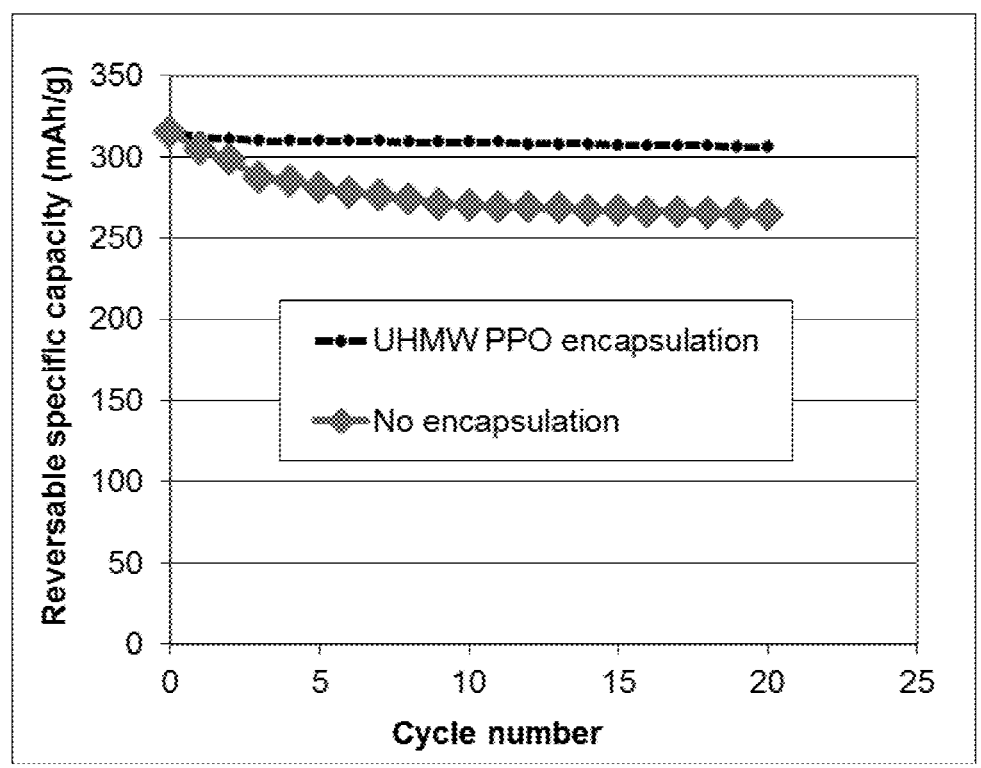
FIG. 5 The discharge capacity curves of two coin cells having two different types of cathode active materials: (1) high-elasticity UHMW PPO-encapsulated metal fluoride particles and (2) non-encapsulated metal fluorides.

Shown in FIG. 5 are the discharge capacity curves of two coin cells having two different types of cathode active materials: (1) high-elasticity UHMW PPO polymer-encapsulated metal fluoride particles and (2) non-encapsulated metal fluorides. These results have clearly demonstrated that the high-elasticity UHMW polymer encapsulation strategy provides excellent protection against capacity decay of a lithium metal battery featuring a high-capacity cathode active material.

The high-elasticity polymer appears to be capable of reversibly deforming without breakage when the cathode active material particles expand and shrink. The polymer also remains chemically bonded to the binder resin when the active particles expand or shrink. In contrast, both SBR and PVDF, the two conventional binder resins, are broken or detached from some of the non-encapsulated active material particles. The high-elasticity polymer has contributed to the structural stability of the electrode layer. These were observed by using SEM to examine the surfaces of the electrodes recovered from the battery cells after some numbers of charge-discharge cycles.

Example 4: Metal Naphthalocyanine/Reduced Graphene Oxide (FePc/RGO) Hybrid Particulates Encapsulated by a High-Elasticity Polymer Particles of combined FePc/graphene sheets were obtained by ball-milling a mixture of FePc and RGO in a milling chamber for 30 minutes. The resulting FePc/RGO mixture particles were potato-like in shape. Some of these mixture particles were encapsulated by a high-elasticity UHMW PAN polymer using the pan-coating procedure. Two lithium cells were prepared, each containing a Li foil anode, a porous separator, and a cathode layer of FePc/RGO particles (encapsulated or un-encapsulated).

Figure 6:
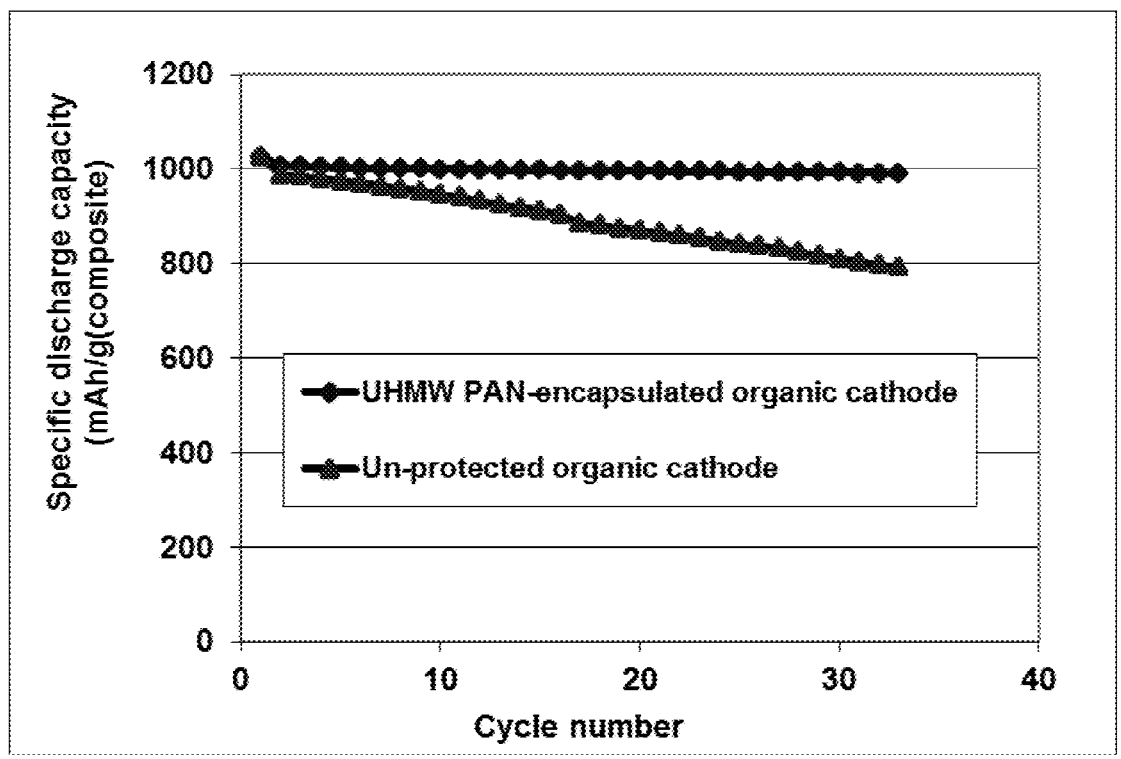
FIG. 6 Specific capacities of two lithium-FePc (organic) cells, each having Li as an anode active material and FePc/RGO mixture particles as the cathode active material (one cell containing un-encapsulated particles and the other containing particles encapsulated by UHMW PAN polymer).

The cycling behaviors of these 2 lithium cells are shown in FIG. 6, which indicates that the lithium-organic cell having a high-elasticity polymer-encapsulated particulates in the cathode layer exhibits a significantly more stable cycling response. This encapsulation polymer reduces or eliminates direct contact between the catalytic transition metal element (Fe) and the electrolyte, yet still being permeable to lithium ions. This polymer also completely eliminates the dissolution of naphthalocyanine compounds in the liquid electrolyte. This approach has significantly increased the cycle life of all lithium-organic batteries.

Example 5: Effect of Lithium Ion-Conducting Additive in a High-Elasticity Polymer A wide variety of lithium ion-conducting additives were added to several different polymer matrix materials to prepare encapsulation shell materials for protecting core particles of an anode active material. The lithium ion conductivity vales of the resulting polymer/salt complex materials are summarized in Table 1 below. We have discovered that these polymer composite materials are suitable encapsulation shell materials provided that their lithium ion conductivity at room temperature is no less than $10^{-6}$ S/cm. With these materials, lithium ions appear to be capable of readily diffusing in and out of the encapsulation shell having a thickness no greater than 1 μm. For thicker shells (e.g. 10 μm), a lithium ion conductivity at room temperature no less than $10^{-4}$ S/cm would be required.

TABLE 1

Lithium ion conductivity of various UHMW polymer compositions as a shell material for protecting anode active material particles.

| Sample No. | Lithium-conducting additive | UHMW polymer + PC or EC (1-2 μm thick) | Li-ion conductivity (S/cm) |
|---|---|---|---|
| UE-1p | $Li_2CO_3 + (CH_2OCO_2Li)_2$ | 70-99% PEO | $2.2 \times 10^{-4}$ to $3.3 \times 10^{-3}$ S/cm |
| UE-2p | $Li_2CO_3 + (CH_2OCO_2Li)_2$ | 65-99% PAN | $4.7 \times 10^{-4}$ to $2.1 \times 10^{-3}$ S/cm |
| UE-3p | $Li_2CO_3 + (CH_2OCO_2Li)_2$ | 65-99% PEO + PPO | $8.4 \times 10^{-4}$ to $3.8 \times 10^{-3}$ S/cm |
| UD-4p | $Li_2CO_3 + (CH_2OCO_2Li)_2$ | 70-99% PMMA | $7.8 \times 10^{-5}$ to $2.3 \times 10^{-4}$ S/cm |
| UD-5p | $Li_2CO_3 + (CH_2OCO_2Li)_2$ | 75-99% PVA | $6.9 \times 10^{-5}$ to $1.2 \times 10^{-3}$ S/cm |
| UB1p | $LiF + LiOH + Li_2C_2O_4$ | 60-90% PVA | $8.7 \times 10^{-5}$ to $2.3 \times 10^{-3}$ S/cm |
| UB2p | LiF + HCOLi | 80-99% PVA | $3.8 \times 10^{-3}$ to $4.6 \times 10^{-4}$ S/cm |
| UB3p | LiOH | 70-99% PPO | $3.5 \times 10^{-3}$ to $1.2 \times 10^{-2}$ S/cm |
| UB4p | $Li_2CO_3$ | 70-99% PPO | $2.2 \times 10^{-3}$ to $9.5 \times 10^{-3}$ S/cm |
| UB5p | $Li_2C_2O_4$ | 70-99% PPO | $1.4 \times 10^{-3}$ to $1.2 \times 10^{-2}$ S/cm |
| UB6p | $Li_2CO_3$ + LiOH | 70-99% PEG | $1.5 \times 10^{-3}$ to $1.6 \times 10^{-2}$ S/cm |
| UC1p | $LiClO_4$ | 70-99% PEO | $4.6 \times 10^{-4}$ to $2.2 \times 10^{-3}$ S/cm |
| UC2p | $LiPF_6$ | 70-99% PEO | $3.4 \times 10^{-4}$ to $7.5 \times 10^{-3}$ S/cm |
| UC3p | $LiBF_4$ | 70-99% PAA | $1.1 \times 10^{-4}$ to $1.6 \times 10^{-3}$ S/cm |
| UC4p | $LiBOB + LiNO_3$ | 70-99% PMEA | $2.2 \times 10^{-4}$ to $4.3 \times 10^{-3}$ S/cm |
| US1p | Sulfonated polyaniline | 85-99% PAN | $5.8 \times 10^{-5}$ to $9.2 \times 10^{-4}$ S/cm |
| US2p | Sulfonated SBR | 85-99% PEO | $1.6 \times 10^{-4}$ to $1.2 \times 10^{-3}$ S/cm |
| US3p | Sulfonated PVDF | 80-99% PEG | $3.2 \times 10^{-4}$ to $2.3 \times 10^{-4}$ S/cm |

Example 6: Cycle Stability of Various Rechargeable Lithium Battery Cells

In lithium-ion battery industry, it is a common practice to define the cycle life of a battery as the number of charge-discharge cycles that the battery suffers 20% decay in capacity based on the initial capacity measured after the required electrochemical formation. Summarized in Table 2 below are the cycle life data of a broad array of batteries featuring presently invented electrodes containing anode active material particles bonded by different binder materials.

TABLE 2

Cycle life data of various lithium secondary (rechargeable) batteries.

| Sample ID | Encapsulation polymer | Type & % of cathode active material | Initial capacity (mAh/g) | Cycle life (No. of cycles) |
|---|---|---|---|---|
| $CuCl_2$-1e | UHMW PEO | 85% by wt. $CuCl_2$ particles (80 nm) + 7% graphite + 8% binder | 530 | 1677 |
| $CuCl_2$-2e | none | 85% by wt. $CuCl_2$ particles (80 nm) + 7% graphite + 8% binder | 527 | 113 |
| $BiF_3$-1e | none | 85% by wt. $BiF_3$ particles + 7% graphene + 8% binder | 275 | 115 |
| $BiF_3$-2e | UHMW PAN | 85% by wt. $BiF_3$ particles + 7% graphene + 8% binder | 276 | 1,334 |
| $Li_2MnSiO_4$-1e | UHMW PPO | 85% C-coated $Li_2MnSiO_4$ + 7% CNT + 8% binder | 252 | 2,525 |
| $Li_2MnSiO_4$-2e | none | 85% C-coated $Li_2MnSiO_4$ + 7% CNT + 8% binder | 252 | 543 |
| $Li_6C_6O_6$-1e | UHMW PEO + 20% polyanniline | $Li_6C_6O_6$-graphene ball-milled | 440 | 1,465 |
| $Li_6C_6O_6$-2e | none | $Li_6C_6O_6$-graphene ball-milled | 438 | 116 |
| $MoS_2$-1e | UHMW PEO + 1% graphene | 85% $MoS_2$ + 8% graphite platelets + binder | 225 | 2,444 |
| $MoS_2$-2e | none | 85% $MoS_2$ + 8% graphite platelets + binder | 225 | 156 |

These data further confirm that the high-elasticity UHMW polymer encapsulation strategy is surprisingly effective in alleviating the cathode structural instability-induced capacity decay problems. The high-elasticity UHMW polymer encapsulation layer appears to be capable of preventing liquid electrolyte from being in direct physical contact with the cathode active material and, thus, preventing the catalytic elements (e.g. Fe, Mn, Ni, Co, etc.) in the cathode active material from catalyzing the decomposition of the electrolyte to form volatile or flammable gas molecules inside the battery cell. This otherwise could cause fast capacity decay and fire and explosion hazard. The high-elasticity UHMW polymer encapsulation layer also prevents dissolution of an organic or polymeric active material in the liquid electrolyte, which otherwise would lead to loss of the active material and, thus, capacity loss.

We claim:

1. A method of manufacturing a lithium battery, said method comprising:
    (a) providing a cathode active material layer and a cathode current collector to support said cathode active material layer;
    (b) providing an anode active material layer and an anode current collector to support said anode active material layer; and
    (c) providing an electrolyte in contact with the anode active material layer and the cathode active material layer and a separator electrically separating an anode and a cathode;
    wherein the operation of providing the cathode active material layer includes providing multiple particulates of a cathode active material,
    wherein at least one of said particulates is composed of one or a plurality of cathode active material particles being fully embraced or encapsulated by a layer of an elastic polymer having a recoverable tensile elastic strain from 2% to 200%, a lithium ion conductivity no less than $10^{-6}$ S/cm at room temperature, and a thickness from 0.5 nm to 10 µm, and
    wherein said elastic polymer contains an ultrahigh molecular weight polymer having a molecular weight from $0.5 \times 10^6$ to $9 \times 10^6$ grams/mole dispersed in a solvent is selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), propylene carbonate (PC), dimethyl carbonate (DMC), methylethyl carbonate (MEC), diethyl carbonate (DEC), ethyl propionate, methyl propionate, γ-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, an ionic liquid solvent, and combinations thereof;
    (d) wherein the polymer contains an electrically conductive material dispersed therein and is selected from electro-conductive polymer, a metal particle or wire, a graphene sheet, a carbon fiber, a carbon nanotube, a graphite particle, or expanded graphite flake, an acetylene black particle, or a combination thereof.

2. The method of claim 1 wherein the thickness of said elastic polymer ranges from 1 nm to 100 nm.

3. The method of claim 1, wherein the lithium ion conductivity of said elastic polymer ranges from $1 \times 10^{-5}$ S/cm to $2 \times 10^{-2}$ S/cm.

4. The method of claim 1, wherein said elastic polymer has the recoverable tensile strain from 5% to 100%.

5. The method of claim 1, wherein said providing multiple particulates includes encapsulating or embracing said one or a plurality of cathode active material particles with said layer of elastic polymer using a procedure selected from pan coating, air suspension, centrifugal extrusion, vibrational nozzle, spray-drying, ultrasonic spraying, coacervation-phase separation, interfacial polycondensation, in-situ polymerization, matrix polymerization, or a combination thereof.

6. The method of claim 1, wherein said cathode active material is selected from an inorganic material, organic material, polymeric material, or a combination thereof and wherein said inorganic material does not include sulfur or alkali metal polysulfide.

7. The method of claim 1, wherein said one or a plurality of cathode active material particles is coated with a layer of carbon or graphene.

8. The method of claim 1, wherein said one or a plurality of cathode active material particles is mixed with a carbon, graphene, or graphite material to form a mixture and said mixture is embraced by one or a plurality of graphene sheets.

9. The method of claim 1, wherein said one or plurality of cathode active material particles are mixed with a carbon material, a graphite material, and/or graphene sheets to form a mixture that is embraced by external graphene sheets to form graphene-embraced cathode active material particulates, which are then encapsulated by elastic polymer.

10. The method of claim 1,
wherein said ultrahigh molecular weight polymer is selected from polyacrylonitrile, polyethylene oxide, polypropylene oxide, polyethylene glycol, polyvinyl alcohol, polyacrylamide, poly(methyl methacrylate), poly(methyl ether acrylate), a copolymer thereof, a sulfonated derivative thereof, a chemical derivative thereof, or a combination thereof, wherein the recoverable tensile strain of said elastic polymer ranges from 5% to 100%.

11. The method of claim 1, wherein said ultrahigh molecular weight polymer forms a mixture with an elastomer, an electronically conductive polymer, a lithium-ion conducting material, a reinforcement material, or a combination thereof.

12. The method of claim 11, wherein said lithium ion-conducting material is dispersed in said elastic polymer and is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

13. The method of claim 11,
wherein said lithium ion conducting material is dispersed in said elastic polymer and is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato) borate (LiBOB), lithium oxalyldifluoroborate ($LiBF_2C_2O_4$), lithium nitrate ($LiNO_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

* * * * *